(12) United States Patent
Garcia et al.

(10) Patent No.: US 11,339,919 B2
(45) Date of Patent: May 24, 2022

(54) REMOTE RELEASE ASSEMBLY FOR A SURFACE MOUNT

(71) Applicant: Valeda Company, LLC, Oakland Park, FL (US)

(72) Inventors: Jonathan Garcia, Oakland Park, FL (US); Olinamyr Davalos, Ft. Lauderdale, FL (US)

(73) Assignee: VALEDA COMPANY, LLC, Oakland Park, FL (US)

( * ) Notice: Subject to any disclaimer, the term of this patent is extended or adjusted under 35 U.S.C. 154(b) by 34 days.

(21) Appl. No.: 16/937,269

(22) Filed: Jul. 23, 2020

(65) Prior Publication Data

US 2021/0025544 A1 Jan. 28, 2021

Related U.S. Application Data

(60) Provisional application No. 63/040,480, filed on Jun. 17, 2020, provisional application No. 62/877,712, filed on Jul. 23, 2019.

(51) Int. Cl.
*F16M 11/04* (2006.01)
*F16M 13/02* (2006.01)
(Continued)

(52) U.S. Cl.
CPC ............. *F16M 13/02* (2013.01); *A61G 3/001* (2013.01); *B60P 7/0807* (2013.01); *B60R 11/00* (2013.01);
(Continued)

(58) Field of Classification Search
CPC ..... F16M 11/041; A61G 3/001; B60P 7/0807; B60R 2011/0071
See application file for complete search history.

(56) References Cited

U.S. PATENT DOCUMENTS 7,185,862 B1    3/2007  Yang
8,077,449 B2 *  12/2011 Mi ......................... F16M 11/24
                                                         361/679.21
(Continued)

FOREIGN PATENT DOCUMENTS

GB          1306805 A       2/1973

OTHER PUBLICATIONS

Apr. 29, 2020 Communication in PCT/US2019/066978 (including Provisional Opinion Accompanying the Partial Search Result).
(Continued)

*Primary Examiner* — Bradley Duckworth
(74) *Attorney, Agent, or Firm* — Daniel Tallitsch

(57) ABSTRACT

A surface mount assembly may comprise at least one connector set, including a mount anchor and mount fitting that are configured to lockingly engage, and a remote release assembly for unlocking the two. The surface mount assembly may include a catch to catch the mount fitting as it drops from engagement with the mount anchor. The surface mount assembly may further include a guide member for guiding the mount fitting into engagement with the mount anchor. The surface mount assembly may further include a case mount assembly that is crashworthy, in that it is configured to transfer the loads from cargo contained in the case to the mount fitting, while largely bypassing the case. The surface mount assembly may also include two connector sets, where the remote release assembly is disposed between the two and is configured to simultaneous release each of the two from engagement.

20 Claims, 17 Drawing Sheets

(51) Int. Cl.
    *B60R 11/00*     (2006.01)
    *A61G 3/00*     (2006.01)
    *B60P 7/08*     (2006.01)

(52) U.S. Cl.
    CPC .... *F16M 11/041* (2013.01); *B60R 2011/0071* (2013.01)

(56) References Cited

U.S. PATENT DOCUMENTS

| | | | | |
|---|---|---|---|---|
| 8,356,948 | B2* | 1/2013 | Onishi | G03B 17/561 |
| | | | | 396/419 |
| 8,578,647 | B2* | 11/2013 | Storch | F41C 27/00 |
| | | | | 42/124 |
| 8,984,665 | B2* | 3/2015 | Celona | A42B 3/04 |
| | | | | 2/6.2 |
| 9,732,784 | B2* | 8/2017 | Clouser | F16M 11/08 |
| 9,944,217 | B2* | 4/2018 | Schroeder | B60P 7/0815 |
| 10,427,724 | B2* | 10/2019 | Line | F15B 21/048 |
| 10,487,978 | B2* | 11/2019 | Cole | F16M 11/041 |
| 10,876,325 | B2* | 12/2020 | Cheung | G06F 1/1607 |
| 11,089,698 | B2* | 8/2021 | Monroe | F16M 11/22 |
| 2006/0231667 | A1* | 10/2006 | Tsuo | F16M 11/041 |
| | | | | 242/384.5 |
| 2012/0126075 | A1 | 5/2012 | Chinn et al. | |
| 2013/0334269 | A1 | 12/2013 | Cardonna et al. | |
| 2014/0374564 | A1 | 12/2014 | Schroeder et al. | |
| 2015/0300061 | A1 | 10/2015 | Fabre et al. | |
| 2020/0191185 | A1 | 6/2020 | Girardin et al. | |
| 2020/0245488 | A1* | 7/2020 | Iacovoni | H05K 5/0234 |

OTHER PUBLICATIONS

Jun. 24, 2020 International Search Report and Written Opinion in PCT/US2019/066978.

International Search Report and Written Opinion dated Nov. 2, 2020 in PCT/US2020/043284.

* cited by examiner

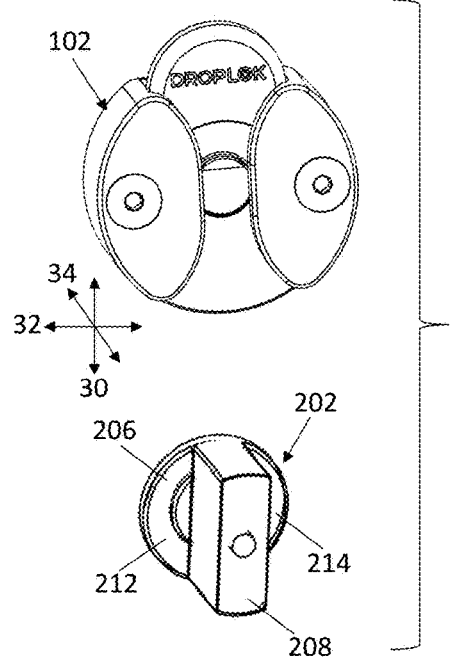
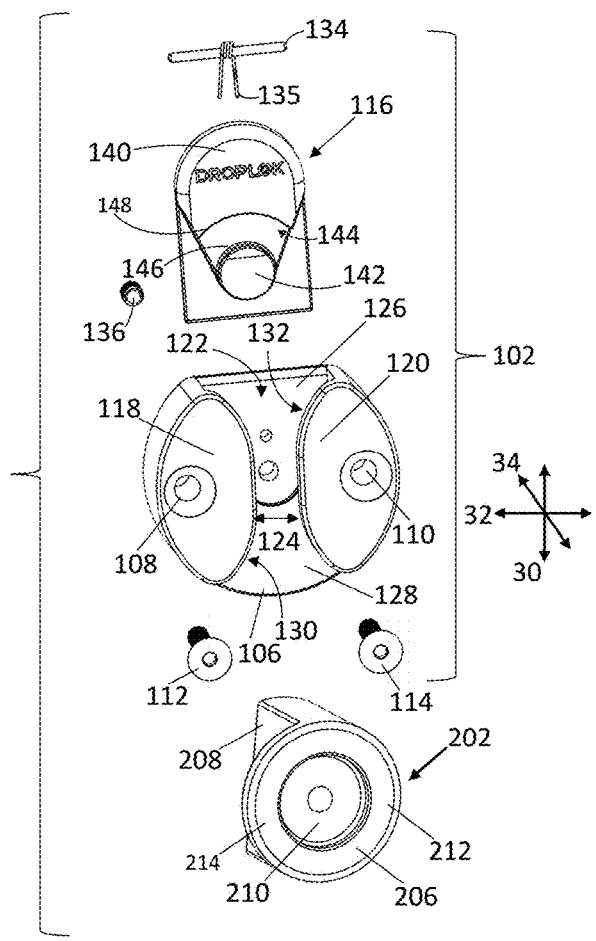
FIG. 2
FIG. 3

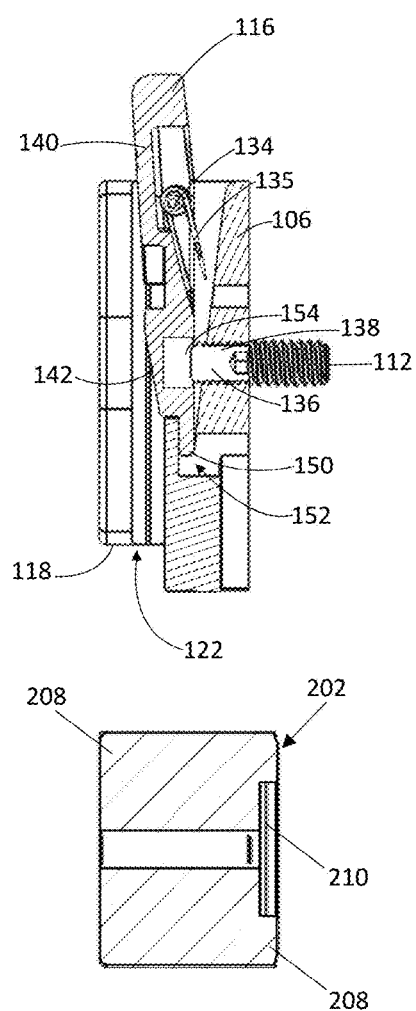
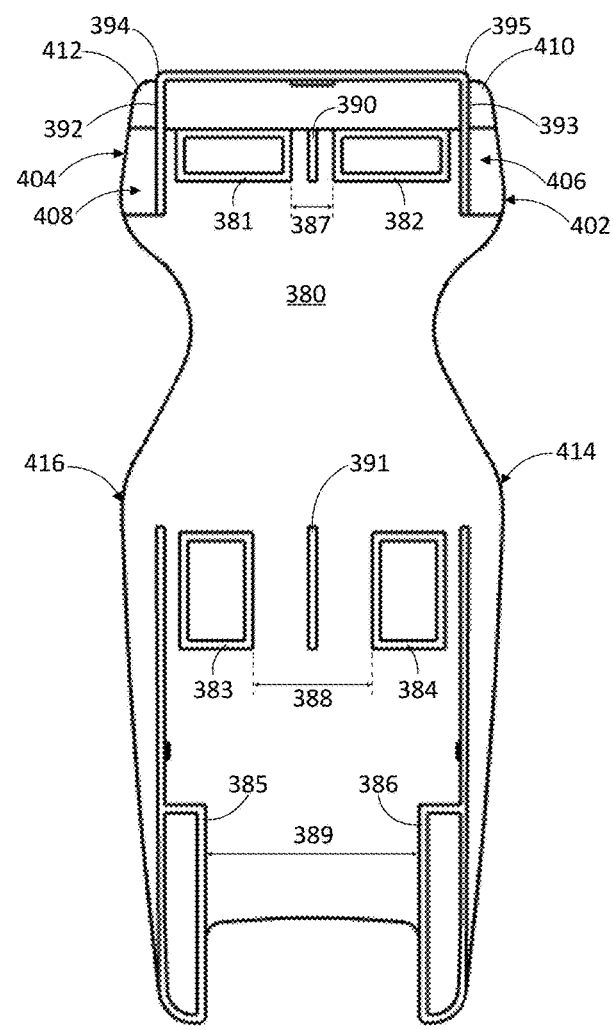
FIG. 4
FIG. 11

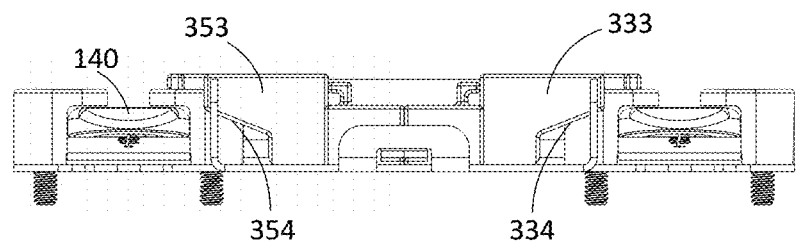
FIG. 8
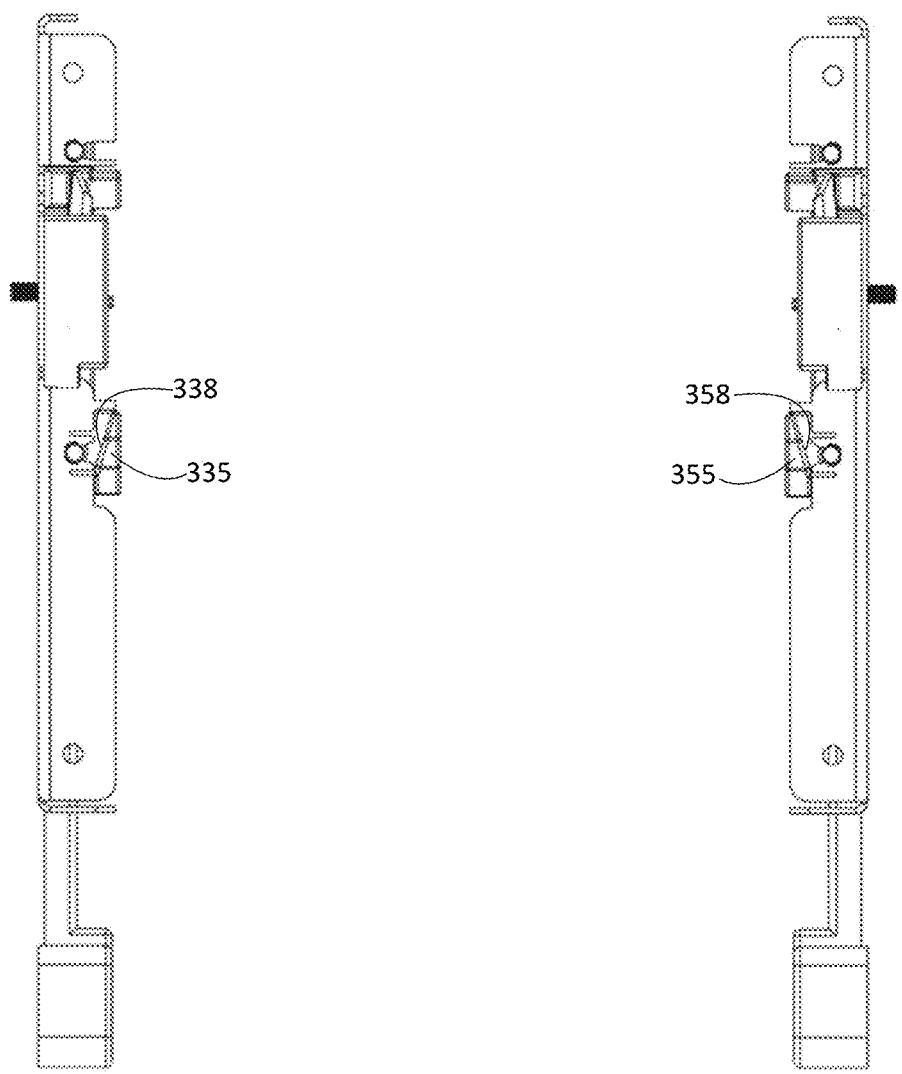
FIG. 9
FIG. 10

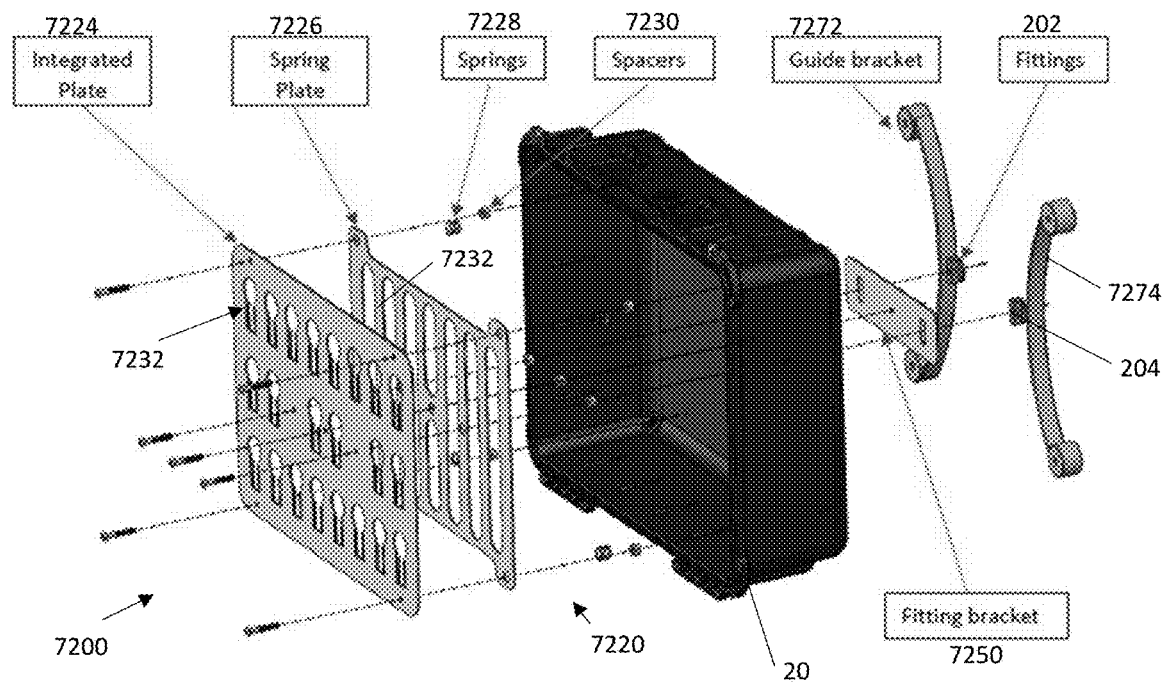
FIG. 29
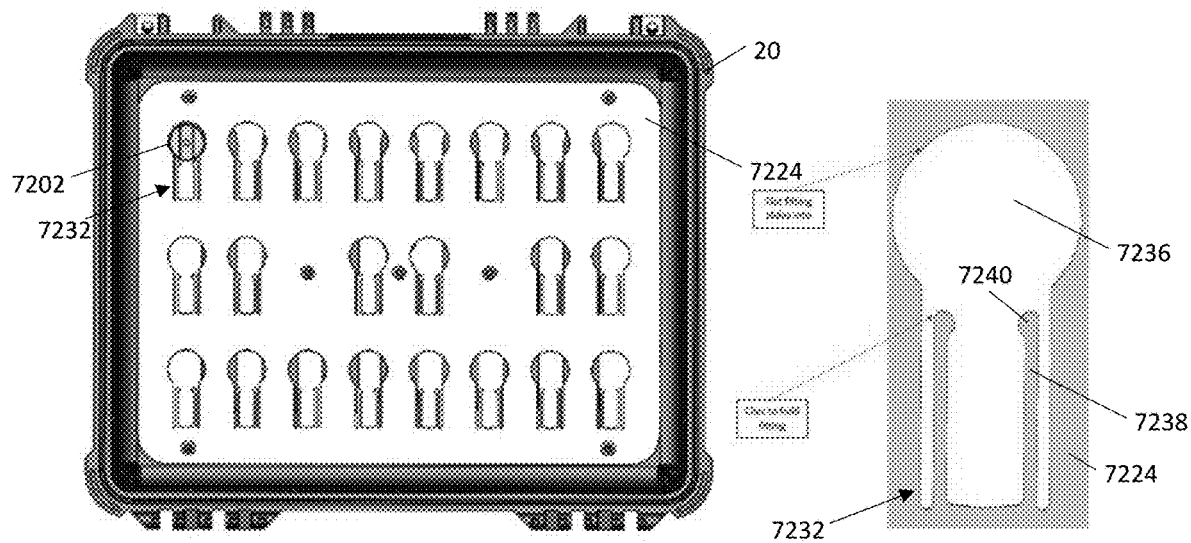
FIG. 30
FIG. 31

REMOTE RELEASE ASSEMBLY FOR A SURFACE MOUNT

CROSS-REFERENCE TO OTHER APPLICATIONS

This application claims priority to U.S. Provisional Patent Application No. 62/877,712, filed on Jul. 23, 2019, and U.S. Provisional Patent Application No. 63/040,480, filed on Jun. 16, 2020, the contents of which are incorporated herein by reference.

This application also incorporates by reference U.S. patent application Ser. No. 16/224,703, filed on Dec. 18, 2018 and International Application No. PCT/US20/43284, filed on Jul. 23, 2020.

BACKGROUND

Technical Field

The embodiments described and claimed herein relate generally to methods, systems, and devices for securing equipment to a surface. In one embodiment, a surface mount assembly is secured to a surface, while a case mount assembly is secured to a case or bag. The surface mount assembly and case mount assembly may be removably attached. A remote release assembly includes a remote release trigger to disengage the surface mount assembly and case mount assembly. The embodiments described and claimed herein have many different applications, including in ambulances, where crashworthy securement systems are necessary to secure equipment.

Background Art

Ambulances rely on securement systems to secure medical equipment to the walls and other surfaces of the vehicle during daily operation. These systems are required to firmly restrain the equipment in the event that the vehicle undergoes any sudden maneuvers or crashes. These systems must also maximize the amount of medical equipment that can be stored in the vehicle, while providing enough space for the emergency medical personnel to navigate throughout the vehicle. An ideal securement system would also allow for rapid release and attachment, and remote detachment, of the medical equipment to provide more efficiency during emergencies.

Current ambulance equipment storage systems, which generally include shelves, cabinets, and systems of vertical securement straps, nets, and carabiner clips, suffer several drawbacks. Wall-mounted cabinets or shelves are bulky and oversized and reduce the storage capacity of the ambulance, as well as available space for emergency medical personnel. Additionally, only equipment that fits within the dimensions of the individual shelves or cabinet drawers can be stored. A system of restraints, nets, and carabiners allows for storage of a wider range of equipment. However, these systems are typically strenuous and time-consuming to use. In securing a heavy piece of equipment to the wall, an ambulance operator is required to lift the device for securement against the wall and to hold it in place while attaching each individual carabiner clip to the desired point of connection. The operator is unable to attach the device to the wall in one movement and instead must hold it in place until every necessary connection is formed. The requirement of a secondary lifting for removal of that device can also impose similar hazards as the securement steps must be reversed.

Accordingly, there is a need for an improved securement system for securing equipment to vehicle surfaces.

SUMMARY OF THE PRESENT EMBODIMENTS

Clearly, the prior art devices have limitations which the present embodiments overcome. The embodiments described and claimed herein may include any one or more of the following structures and features to overcome those limitations:

A catch is provided to catch the cargo or case as it drops out of the bottom of the securement device due to gravity, which prevents accidental drop of equipment Angled surface on the catch causes the bag to tilt outward for easy removal Catches are removable/stowable whereby the catch feature can be selectively engageable/disengageable; alternative embodiments include catches that snap into/out of place, rotate into/out of place, slide into/out of place, etc.

Catches only deploy when the release is triggered and stow out of position to permit securement of the cargo from the underside of the anchors Guide members, including guide surfaces/ridges/contours, cooperate with a case mount assembly to permit blind securement of the cargo—one merely needs to place the cargo against the surface and fittings on the case naturally find their way into engagement with the anchors attached to the surface Wings at top and bottom of a remote release assembly catch the fittings and pull them toward the surface and opening in the anchor to prevent the case from being pulled away from the case when the fittings are approaching engagement with the anchors Ramps at top and bottom of the remote release assembly guide the fittings for left/right alignment with the anchors Curved nature of fittings engages the remote release assembly in a way that guides the fittings for left/right alignment with the anchors Cover has a ramp on outer wings that engages with the fittings to pull the case toward the surface so that the fittings are aligned with the openings/channel in the anchor Bumper on the back side of the case with chamfered edges engages the front face of the remote release assembly to push the case away from the surface so that the fittings are aligned with the openings/channel in the anchor The remote release assembly may include optional "elephant ears" that guide the outside edge of the case-mounted fittings Magnet could be placed in center of bag plate to keep bag centered as it is sliding down The case handle and release trigger are within simultaneous reach of a user's single handle, so that the user can grab bag handle and trigger release simultaneously to remove bag (one handed operation)

Visual/audible indication of engagement between fitting and anchor

Visual indication that the safe release is in the "locked" position—for example, the slider or other mechanism in the remote release assembly has a finger that extends out of the top/bottom of the housing when "unlocked," finger disappears when remote release assembly is "locked"

The remote release assembly is mounted to wall using a quick connect/disconnect attachment—in an application where there is a grid of surface-mounted mount anchors, the remote release assembly could be quickly located between any pair of mount anchors A pair of cams cooperate to unlock a pair of spaced-apart mount anchors—the cams covert up/down movement of release trigger/slider into lateral (side to side) movement of release members; cams have angled surface that depresses mount anchor release trigger as they slide laterally A back plate and cover of the remote release assembly have guides for the slider to guide linear sliding movement up/down and keep the slider in plane The slider/remote trigger extend from top to bottom of the remote release assembly—can be depressed at one end and/or pulled on the other end to unlock the mount anchors Sliding rods permit release members to slide laterally (left/right) and keeps them in plane Spring keeps cams pulled together as a default (fail safe lock position for mount anchors)

Bag mounting plate (outer) has a register to keep fittings from rotating—the register can be cross shaped so that bag can be oriented in both portrait and landscape orientation Bag mounting plate (inner)
  Plurality of breakaway panels so it can be customized for use with bags/cases of various size
  Includes various cutouts to reduce weight
  Includes other cutouts to receive straps or nets Cams are constructed from multiple pieces—the top release is the same part as the bottom catch The case mounting assembly enables the load of the cargo in an accident to bypass the case—the load is instead transferred from the straps or other internal securement for the cargo directly through the hardware ware of the case mounting assembly directly to the mount fittings, and thus, directly to the mount anchors, without passing through the case

BRIEF DESCRIPTION OF THE SEVERAL VIEWS OF THE DRAWINGS

These and other features, aspects, objects, and advantages of the embodiments described and claimed herein will become better understood upon consideration of the following detailed description, appended claims, and accompanying drawings.

FIG. 2 is perspective view of the mount anchor and mount fitting of the first embodiment;

FIG. 3 is an exploded view of the mount anchor and mount fitting of the first embodiment;

FIG. 4 is a cross-sectional view of the mount anchor and mount fitting of the first embodiment;

FIG. 8 is a top view of the remote release assembly of the first embodiment;

FIG. 9 is a first side view of the remote release assembly of the first embodiment;

FIG. 10 is a second side view of the remote release assembly of the first embodiment;

FIG. 11 is a rear view of the cover for the remote release assembly of the first embodiment;

FIG. 29 is a perspective exploded view of a seventh embodiment of a case mount assembly that's in configured to cooperate with a surface mount assembly to releaseably secure a case to a surface;

FIG. 30 is a front view of an open case of the seventh embodiment with the lid removed; and, FIG. 31 is a detailed front view of a plate of the seventh embodiment showing an integrated slot and spring clips that are configured to receive a mount fitting.

Figure 1:
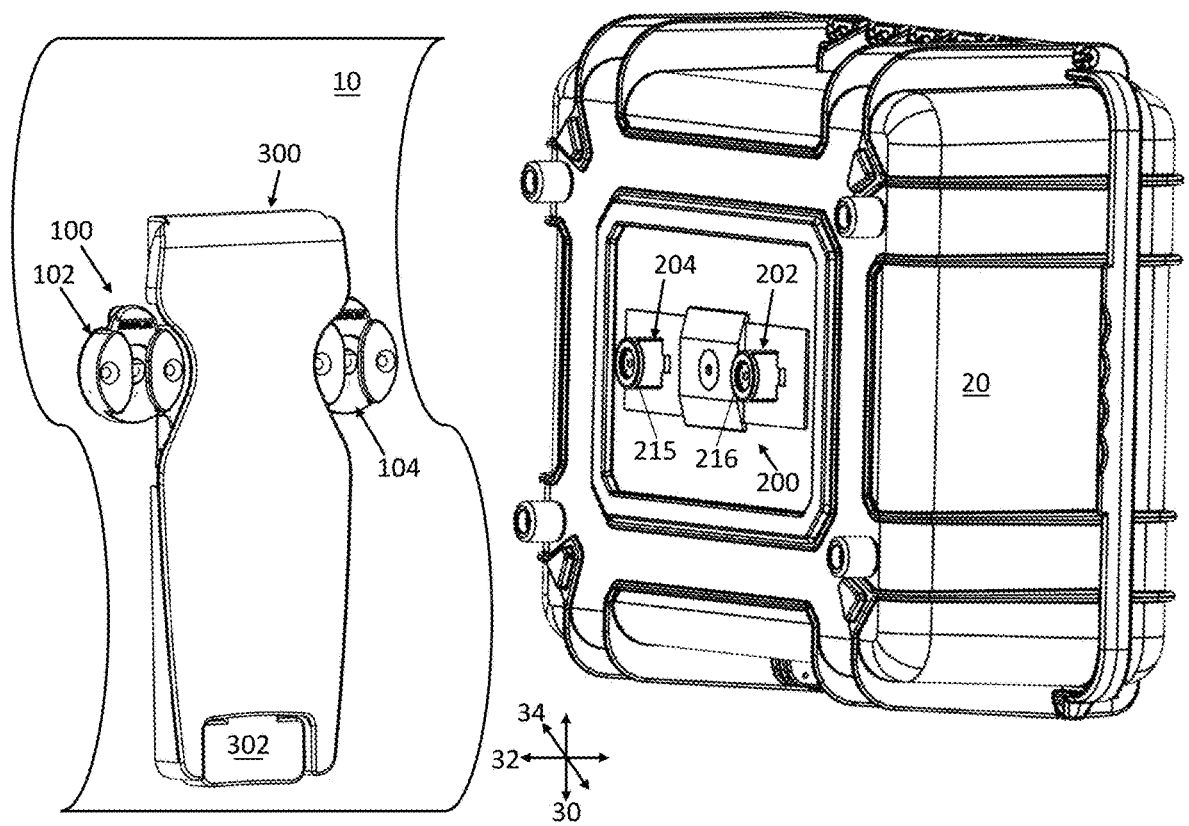
FIG. 1 is a perspective view of a first embodiment of surface mount assembly that includes mount anchors, mount fittings, a remote release assembly, and a case mount assembly that cooperate to releaseably secure a case to a surface.

It should be understood that the drawings are not necessarily to scale and that the embodiments are sometimes illustrated by graphic symbols, phantom lines, diagrammatic representations and fragmentary views. In certain instances, details which are not necessary for an understanding of the embodiments described and claimed herein or which render other details difficult to perceive may have been omitted. It should be understood, of course, that the inventions described herein are not necessarily limited to the particular embodiments illustrated. Indeed, it is expected that persons of ordinary skill in the art may devise a number of alternative configurations that are similar and equivalent to the embodiments shown and described herein without departing from the spirit and scope of the claims.

Like reference numerals will be used to refer to like or similar parts from Figure to Figure in the following detailed description of the drawings.

DETAILED DESCRIPTION OF THE PRESENT EMBODIMENTS

FIG. 1 shows a first embodiment of a surface mount assembly 100 and a case mount assembly 200 that cooperate to secure a case 20 to a surface 10, and a remote release assembly 300 that is configured to unlock the case assembly mount assembly 200 from the surface mount assembly 100. The surface mount assembly 100 includes one or more mount anchors 102, 104, while the case mount assembly includes one or more corresponding mount fittings 202, 204. The mount anchors 102, 104 are configured to engage and lock with the mount fittings 202, 204 to hold the case 20 to the surface 10.

In the shown embodiment, the mount anchors 102, 104 and mount fittings 202, 204 generally take the form of the rapid release anchors and fittings discussed in the Applicant's co-pending U.S. patent application Ser. No. 16/224,703, filed on Dec. 18, 2018 ("the '703 application), which is incorporated herein by reference. However, other forms of corresponding connectors may be used as the mount anchor and mount fitting, including but not limited to magnets. Connectors that are configured for two-way engagement and release (up and down, in the depicted configuration) like the mount anchors 102, 104 and mount fittings 202, 204 are preferable.

The left mount anchor 102 and left mount fitting 202 are shown in more detail in FIGS. 2-4. The right mount anchor 104 and right mount fitting 204 may be identical. The left mount fitting 202 is capable of releasably engaging with the left mount anchor 102 by sliding in either direction along axis 30 (from the top or bottom). The left mount fitting 202 may comprise a channel engaging member 206 with an attachment member 208 on one face and a fitting locking structure 210 on the opposite face. The channel engaging member 206 may be a plate, such as a circular disc, as shown, or other shape that is compatible with and lockingly engages with a channel 122 of the left mount anchor 102. The channel engaging member 206 may include a first channel engaging member 212 and a second channel engaging member 214 that may extend laterally or outward from opposite sides of the attachment member 208, wherein each of the first and second channel engaging members 212, 214 may be configured to be received in corresponding undercuts 130, 132 in the left mount anchor 102. The attachment member 208, may take the form of a post, as shown, or any other shape or structure that is capable of being attached to the case 20 and serving as a spacer between case 20 and the channel engaging member 206. The fitting locking structure 210 may be a blind hole, as shown, wherein the blind hole is designed to engage with the anchor 102 to lock the fitting 202 in place on the left mount anchor 102, as described in further detail below.

The left mount anchor 102 may be comprised of an anchor plate 106 with one or more bores 108, 110 for receiving bolts or similar fasteners 112, 114 that connect the mount anchor 102 to the surface 10 and/or the surface mount assembly 100. The mount anchor 102 further includes a locking member 116 and two retaining members 118, 120. The two retaining members 118, 120 may be generally L-shaped and extend away from the anchor plate 106 and inward (toward each other) from opposite sides of the anchor plate 106, whereby the anchor plate 106 and retaining members 118, 120 collectively define a channel 122. The channel 122 includes an open slot 124 extending from a top open end 126 to a bottom open end 128 and undercuts 130, 132 on either side of the open slot 124. As such, the channel 122 may slidingly receive the mount fitting 202 from one or both of the top open end 126 and bottom open end 128, whereby the first and second laterally extending members 212, 214 of the mount fitting 202 will be received by the undercuts 130, 132 in the anchor 102 and the attachment member 208 of the mount fitting 202 will be received by the slot 124 in the anchor 102. In alternative embodiments, one of the top open end 126 or bottom open end 128 may be closed to permit engagement from only the top or bottom of the anchor 102. The width of the open slot 124 is less than both the width of the anchor plate 106 and the channel engaging member 206, whereby the first and second laterally extending members 212, 214 of the fitting 202 are able to slide under the retaining members 118, 120 into the undercuts 130, 132, whereby the retaining members 118, 120 and anchor plate 106 collectively restrict movement of the mount fitting 202 along an axis 32 and an axis 34 when the mount fitting 202 is slid into the channel 122. The shape of the attachment member 208 (generally rectangular cross-section, in this case) cooperates or engages with the edges of the retaining members 118, 120 to prevent rotation of the mount fitting about axis 34. In alternative embodiments, where rotation about axis 34 may be desired, the shape of the attachment member 208 may be changed (perhaps to a generally circular cross section, or reduce the length of the attachment member along axis 30 so that it is less than the width of slot 124) or the width of the slot 124 may be increased to prevent engagement between the attachment member 208 and the retaining members 118, 120. In alternative embodiments, the shape or dimensions of one or more of the attachment member 208, the slot 124, the retaining members 118, 120, the fitting locking structure 210, and/or the anchor locking structure 142 may be modified to limit rotation of the fitting 202 within a predetermined range, or to substantially preclude rotation.

The locking member 116 is provided to restrict movement of the mount fitting 202 along axis 30. The locking member 116 has an unlocked position, whereby the mount fitting 202 can translate in the channel 122 along axis 30, and a locked position, whereby the mount fitting 202 is precluded from translating in the channel 122 along axis 30. The locking member 116 may be spring-loaded in the locked position, as shown. More particularly, a pin 134 may be disposed on an underside of the locking member 116, wherein a spring 135 may be coiled around the pin 210 and have two ends that push the locking member 116 away from the anchor plate 106. The locking member 116 may also be linked to the anchor plate 106 via a flange 150 at the bottom edge of the locking member 116 that is received in a corresponding pocket 152 in the anchor plate 106 and a set screw 136 that is received by bore 138 of the anchor plate 106 and a corresponding bore 154 in the locking member, as shown, whereby the locking member 116 may generally pivot relative to the anchor plate about the flange 150 at its bottom edge. The locking member 116 has a trigger 140 at a top end which, in this case, is a button that may be depressed to move the locking member 116 to the unlocked position, whereby the mount anchor 102 will be disengaged from the mount fitting 202. The locking member 116 also has an anchor locking structure 142 at a bottom end. The anchor locking structure 142 is disposed within the channel 122 and is configured to engage with the fitting locking structure 210. More particularly, as shown, the anchor locking structure 142 may be a projection and the fitting locking structure 210 may be a hole (e.g., a blind hole), wherein the projection lockingly engages in the blind hole to secure the mount fitting 202 to the mount anchor 102. Engaging the trigger 140 causes the projection to disengage from the hole. Notably, the anchor locking structure 142 may be a hole and the fitting locking structure 210 may be a projection. In yet other embodiments, the anchor locking structure 142 and fitting locking structure 210 can take the form of any other complementary locking structures.

To improve the positive engagement between the mount anchor 102 and the mount fitting 202, the locking member 116 can include an annular-shaped channel 144 defined by walls 146, 148, wherein the annular-shaped channel 144 is designed to receive an annular portion of the channel engaging member 206. More particularly, when the mount fitting 202 is secured in the mount anchor 102, the wall 146 will abut an inner wall of the fitting locking structure 110, and the wall 148 will abut an edge wall of the channel engaging member 206, restricting movement of the mount anchor 102 along at least axis 30, both up and down.

The mount fitting 202 can translate through the channel 122 only when the locking member 116 is moved to the unlocked position. To engage the mount fitting 202 with the anchor 102, the locking member 116 can be moved to the unlocked position by depressing the trigger 140 by force exerted by the mount fitting 202 as it is pushed through the channel 122, or by force applied to the trigger 140 of the locking member 116 towards the anchor plate 106, such as by the user's hands or by the remote release assembly 300 as hereinafter described. To remove the mount fitting 202 from engagement with the anchor 102, the locking member 116 must be moved to the unlocked position by force, such as by the user's hands or by the remote release assembly 300 as hereinafter described.

The right mount anchor 104 and right mount fitting 204 may be identical, as shown in FIG. 1, although identity is not required. For example, in other embodiments, only one set of anchor and fitting may lock.

For a more particular description of the mount anchors and fittings, see the '703 application.

Returning now to FIG. 1, the surface mount assembly 100 may further include a remote release assembly 300 with a remote trigger 302 for unlocking one or more of the mount anchors 102, 104. The remote trigger 302 may be mechanically and/or electronically (wired or wireless) linked to the mount anchors 102, 104. Preferably, the remote trigger 302 is disposed a sufficient distance from the mount anchors 102, 104 in an easily accessible position, although the remote trigger 302 may be obscured from view by the case 20. In the orientation shown in FIG. 1 (vertical surface and release mechanism 300 mounted upright), the remote trigger 302 will be positioned below the case 20 within reach of the user when the case 20 is mounted to the surface 10. In other embodiments, the remote trigger 302 may be located above the case 20, at the side of the case, or elsewhere, and there may be multiple remote triggers. To remove the case 20 from the surface 10, the user may grab the case 20 with one hand and trigger the remote trigger 302 with the other hand. Triggering the remote trigger 302 causes the mount anchors 102, 104 to unlock. The user may then either lift the case 20 upward (causing the mount fittings 202, 204 to slide upward and out of engagement with the mount anchors 102, 104), or allow the case 20 to move downward (causing the mount fittings 202, 204 to slide downward and out of engagement with the mount anchors 102, 104). If not held by the user, the case 20 may naturally, due to gravity, drop out of engagement with the mount anchors 102, 104 when the remote trigger 302 is triggered.

Figure 5:
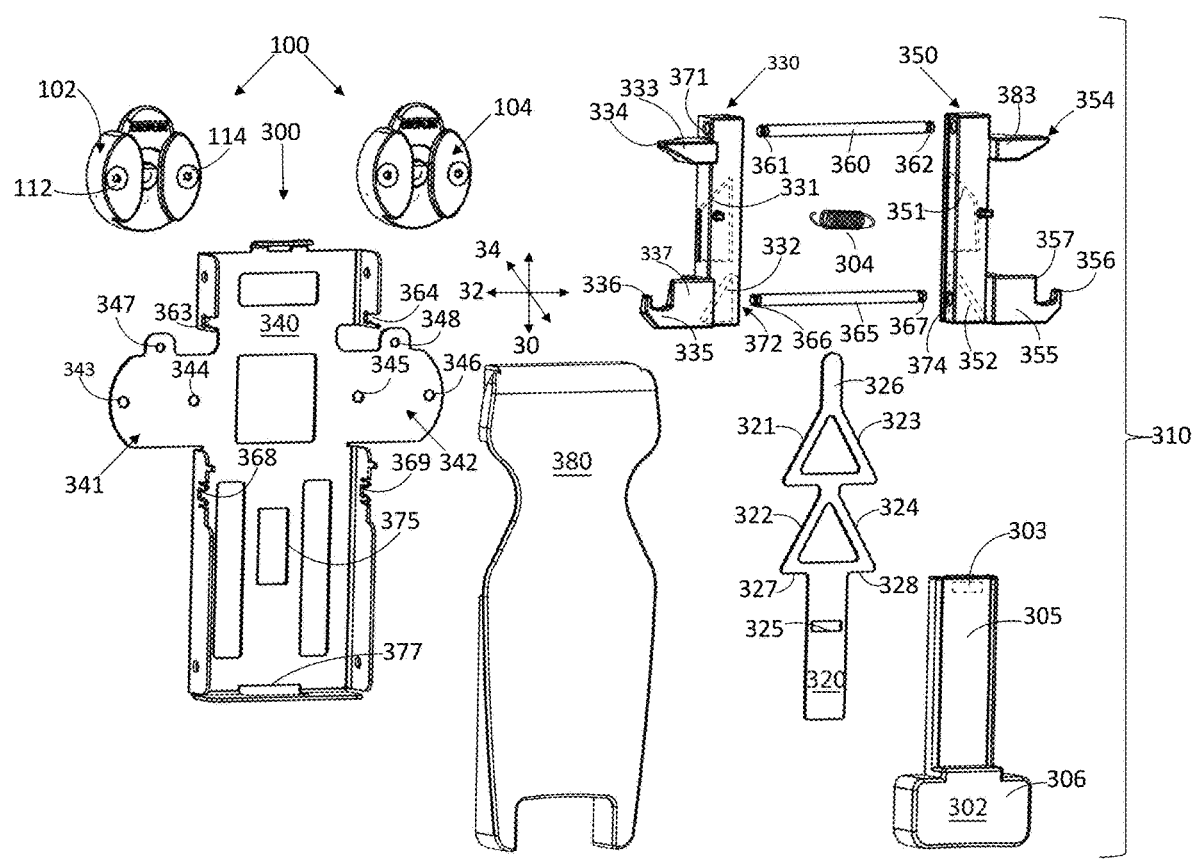
FIG. 5 is an exploded perspective view of the first embodiment of the remote release assembly.

Turning now to FIG. 5, the remote release assembly 300 is shown in exploded view aside the surface mount assembly 100. The remote release assembly 300 may comprise a housing made up of back plate 340 and cover 380. The back plate 340 may include mounting locations 341, 342 for the mount anchors 102, 104, respectively. The mounting locations 341, 342 may each include bores 343, 344, 345, 346 which line up with corresponding bores 108, 110 in the mount anchors 102, 104 for receiving fasteners 112, 114. In that respect, fasteners 112, 114 may be used to secure the mount anchors 102, 104 to the remote release assembly 300. In addition, fasteners 112, 114 may be used to not only secure the mount anchors 102, 104 to the surface 10, but also to secure the remote release assembly 300 to the surface 10. The back plate 340 may also or alternatively include one or more bores 347, 348 for receiving separate fasteners (not shown) to separately secure the remote release assembly 300 to the surface 10. In alternative embodiments, the mounting locations 341, 342 may be omitted, the mount anchors 102, 104 may be secured directly to the surface 10, and the remote release assembly 300 may include one or more registers (e.g., on the back plate 340, the cover 380, or other component thereof) that correspond to the shape of the mount anchors 102, 104 or a portion thereof, for aligning the remote release assembly 300 with the mount anchors 102, 104.

The housing of the remote release assembly 300 is configured to hold the mechanisms and/or electronics that cause the mount anchors 102, 104 to unlock. In the present embodiment, the housing holds a remote release mechanism 310 that may optionally include a "catch" feature. More specifically, the remote release mechanism 310 may comprise the remote trigger 302, a slider 320, a pair of release members 330, 350, guide rods 360, 365, and biasing member 304.

The remote trigger 302—which may be a push button (as shown), a pull, or other structure—and the slider 320 may be configured for linear movement along axis 30 (which, for convenience, will be described as an up/down direction, which corresponds to a typical wall-mount application), while the release members 330, 350 are configured for linear movement along axis 32 (which, for convenience, will be described as a lateral or side to side direction, which corresponds to a typical wall-mount application). As will be described below, the remote release assembly 300 includes one or more features or structures to preclude movement of the remote trigger 302, slider 320, and release members 330, 350 along other axes.

As shown, the slider 320 may be configured as a separate component that is rigidly attached to and moves linearly along axis 30 with the remote trigger 302. Each of the slider 320 and the remote trigger 302 may each include a corresponding connector, such as an aperture 325 on the slider 320 that receives a projection 303 on the remote trigger 302. The aperture 325 may engage with projection 303 through frictional engagement or through an interference or snap-type fit. The locations of the aperture 325 and projection 303 may be switched. In an alternative embodiment, the slider 320 may be made integral with the remote trigger 302. The remote trigger 302 and/or slider 320 and release members 330, 350 include corresponding mechanisms for converting linear movement of the slider along axis 30 into linear movement of the release members 330, 350 along axis 32. In one embodiment, as shown in the figures, the slider 320 includes at least one cam surface 321, 322, 323, 324 for engagement with at least one corresponding cam surface 331, 332, 351, 352 on the release members 330, 350. The cam surfaces 321, 322, 323, 324 cooperate with the corresponding cam surfaces 331, 332, 351, 352 to convert linear movement of remote trigger 302 and slider 320 along axis 30, into linear movement of the release members 330, 350 along axis 32. More particularly, cam surfaces 321, 323 and cam surfaces 322, 324 each form a triangular shape with the apex at the upper end, and corresponding cam surfaces 331, 351 and corresponding cam surfaces 332, 352 are generally parallel thereto (i.e., corresponding cam surfaces 331, 351 and corresponding cam surfaces 332, 352 also each form a triangular shape with the apex at the upper end). Pushing remote trigger 302 and slider 320 upward naturally causes the cam surfaces 321, 323 and cam surfaces 322, 324 to push corresponding cam surface 331 away from corresponding cam surface 351 and corresponding cam surface 332 away from corresponding cam surface 352. In other words, upward movement of the remote trigger 302 causes the release members 330, 350 to move away from each other from their locked position, shown in FIG. 6, to their unlocked position, shown in FIG. 7.

Figure 6:
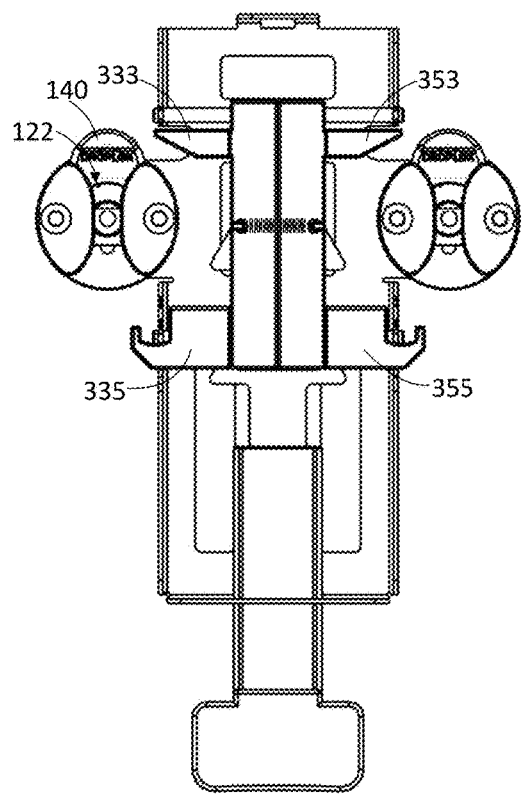
FIG. 6 is a front view of the remote release assembly of the first embodiment in the locked position, with the catches in a non-use position.

The release members 330, 350 are interconnected by a biasing member, such as a spring 304, that pulls the release members 330, 350 toward each other, so that they return to their default (locked) position shown in FIG. 6 when upward pressure is removed from the remote trigger 302. At the same time, the corresponding cam surfaces 331, 332, 351, 352 will push downward upon the cam surfaces 321, 322, 323, 324 thereby also moving the remote trigger 302 from its unlocked position, shown in FIG. 7, back to its default (locked) position, shown in FIG. 6.

Figure 7:
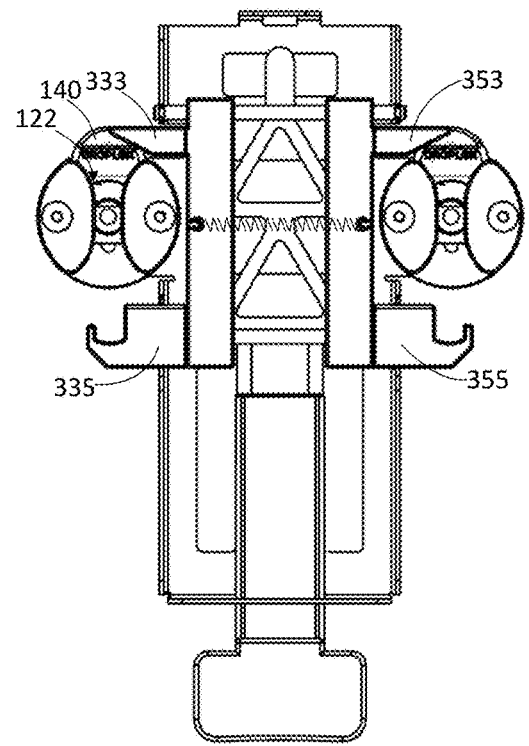
FIG. 7 is a front view of the remote release assembly of the first embodiment in the unlocked position, with the catches in a use position.

The release members 330, 350 may include releases 333, 353 that are positioned and configured to engage with, or depress, the triggers 140 of the mount anchors 102, 104, thereby unlocking the mount anchors 102, 104, when the release members 330, 350 are in the unlocked position, as shown in FIG. 7. When the release members 330, 350 are in the locked position, as shown in FIG. 6, the releases 333, 353 are disengaged or spaced from the triggers 140, which allows the triggers 140 to return to their default, locked position. As best shown in FIG. 8, the releases 333, 353 each include an angled or chamfered engagement face 334, 354 on its rear side to enable a smooth depression and disengagement of the triggers 140. The angled faces 334, 354 and engagement between angled faces 334, 354 and triggers 140 also allows the force from spring 135 to assist in moving release members 330, 350 back to their locked position after pressure on the remote trigger 302 is released.

In some embodiments, the surface mount assembly 100 and/or remote release assembly 300 may include one or more catches which may be disposed below one or both of the mount anchors 102, 104, in particular below the channel 122. It is contemplated that the catches may be used with or without a remote release assembly 300, and may be a component separate from both the remote release assembly 300 and surface mount assembly 100. The catches may be fixed in place or moveable between a catch position, a stow position, and/or a non-use position (described in further detail below). Moreover, the catches may be attached to any structure of the surface mount assembly 100, the mount anchors 102, 104, the remote release assembly 300, or even separately to the surface 10.

In the embodiment shown in FIGS. 5-7, the catches are part of the remote release assembly 300, are mechanically linked to the remote trigger 302, are biased to a stow position to allow the mount fittings 202, 204 to engage the mount anchors 102, 104 from the underside, and only deploy to a catch position underneath the mount anchors 102, 104 when the remote trigger 302 is triggered. More particularly, the release members 330, 350 may include catches 335, 355 that are disposed underneath the channels 122 of the mount anchors 102, 104 when the release members 330, 350 are in the unlocked position (FIG. 7). In that respect, the catches 335, 355 may be positioned to catch the case 20 if it is permitted (accidentally or intentionally) to drop out of the bottom of the mount anchors 102, 104.

The catches permit a one-handed release of the case 20 from the surface 10. Using a single hand, the user may trigger the remote trigger 302, whereby gravity causes the case 20 to move downward and be captured by the catches. The user may then use the same hand to grip and remove the case 20.

In one embodiment, as shown in FIGS. 5-7, the catches 335, 355 may be integrally formed with the release members 330, 350. In other embodiments, the catches may be formed separately from the release members, but attachable thereto. In that respect, the catches can be removed from attachment to the release members or otherwise placed into a stow position to disable the catch feature. In one particular embodiment, the catches may be pivotally attached to the release members 330, 350 via a hinge, whereby in a first position the catch extends outward to essentially the position of catches 335, 355 shown in FIGS. 5-7, and in a second position the catch extends inward toward the opposite release member 330, 350 in a disabled position. In another particular embodiment, each of the catch and the release member include a corresponding connection, such as a snap or slide or male-female connection, whereby the catch can be selectively connected or disconnected from the release member by the user depending upon whether the catch feature is desired. One or more additional corresponding connections may be provided in remote locations, for example on any one or more of the components of the remote release assembly 300 (e.g., on the underside of the housing cover 380), whereby the catches can be stored in the remote location when they are not in use to avoid misplacing the same.

The catches 335, 355 may embody a "U" shape or other shaped cradle for receiving, supporting, and holding the attachment member 208 of the mount fittings 202, 204. The catches 335, 355 may include upwardly extending members 336, 337, 356, 357 that are spaced apart a distance that corresponds to and is slightly greater than the width of the attachment members 208. When the catches 335, 355 are used, upwardly extending members 336, 356 engage the outwardly directed side edges of the attachment member 206 of the mount fittings 202, 204, respectively. In that respect, catches 335, 355 prevent the biasing force of biasing member 304 from causing the release members 330, 350 to return to their default locked position until the user grips and removes the case 20.

The catches 335, 355 may be provided with rear bearing structures 338, 358 that cause the top of the case 20 to be angled or spaced outward from the surface 10 to enable easier gripping and removal of the case. In one embodiment, as shown the rear bearing structures 338, 358 are surfaces that are angled outward from the surface 10 as they extend from bottom to top, as shown in FIGS. 9-10. When the catches 335, 355 are in use holding attachment members 208 of the mount fittings 202, 204, the channel engaging members 206 will be oriented at roughly the same angle by virtue of resting adjacent the angled surfaces of the rear bearing structures 338, 358.

As previously mentioned, the remote release assembly 300 may include one or more features, including but not limited to one or more guide members, that keep the release members 330, 350 moving only laterally along axis 32. In the embodiment shown in FIGS. 5-7, the guide members are guide rods 360, 365 that are received in laterally-facing apertures 371, 372, 373, 374, one aperture at the top and one aperture at the bottom of each release member. Each of the guide rods 360, 365 may include two slots 361, 362, 366, 367 that are disposed near the opposite ends of the guide rods 360, 365. The back plate 340 may in turn include connection members 363, 364, 368, 369 that are configured to receive the guide rods 360, 365 at the slots 361, 362, 366, 367 by snap engagement. In alternative embodiments, the rods 360, 365 may instead be mounted to the cover 380. Moreover, as an alternative to or in combination with the guide rods 360, 365, one or both of the back plate 340 and cover 380 may include projections or other guide members that form a channel or the like that constrain the release members 330, 350 to move laterally along axis 32 and/or keep the release members 330, 350 within the plane defined by axes 30, 32, similar to the guide members described below for the remote trigger and slider 320.

Also as previously mentioned, the remote release assembly 300 may include one or more features, including but not limited to one or more guide members, that keep the remote trigger 302 and slider 320 moving only up and down along axis 30. One such guide member may take form as an aperture 375 in the back plate 340 that receives and guides a portion of one or more of the remote trigger 302 and the slider 320, in this case the projection 303. As can be appreciated from FIG. 5, the aperture 375 has a width that corresponds to the width of the projection 303, and has side edges that will engage with the projection 303 to prevent lateral movement of the remote trigger 302 and slider 320 and keep them moving only up and down along axis 30. The aperture 375 further has upper and lower edges that serve as upper and lower travel limits, respectively, for the remote trigger 302 and slider 320. The back plate 340 may also include an aperture 377 that receives one or both of the remote trigger 302 and slider 320 by mating and/or sliding engagement. The aperture 377 may include side walls that serve as boundaries for corresponding side walls of the remote trigger 302 and/or slider 320 to prevent lateral movement thereof. The cover 380 may also include one or more guide members to guide remote trigger 302 and slider 320 moving only along axis 30. In the embodiment shown in FIG. 11, those guide members may include one or a series of projections 381, 382, 383, 384, 385, 386 that form one or more channels 387, 388, 389 that engage with the left and right sides of one or both of the remote trigger 302 and slider 320 to prevent lateral movement along axis 32, but permit up and down movement along axis 30. As configured in FIG. 11, the space between projections 381, 382 define channel 387, the space between projections 383, 384 define channel 388, and the space between projections 385, 386 define channel 389. Channel 387 has a width that roughly corresponds to the width of a first, or upper portion 326 of the slider 320, whereby the upper portion 326 can be received in the channel 387. Channel 388 has a width that roughly corresponds to the width of a first, or upper portion 305 of the remote trigger 302, whereby the upper portion 305 can be received in the channel 388. Channel 389 has a width that roughly corresponds to the width of a second, or lower portion 306 of the remote trigger 302, whereby the lower portion 306 can be received in the channel 389. Notably, the upper walls of projections 383, 384 may serve as a stop for the slider (engaging at edges 327, 328) in the locked position. Of course, any one or more of these projections may be provided on the back plate 340. Moreover, as an alternative to or in combination with the projections 381, 382, 383, 384, 385, 386, one or both of the back plate 340 and cover 380 may include rods or other guide members that serve as rails for the remote trigger 302 and slider 320 and constrain those components to move up and down along axis 30 and/or keep the remote trigger 302 and slider 320 within the plane defined by axes 30, 32, similar to the guide members described above for the release members 330, 350.

The back plate 340 and cover 380 also include features, including but not limited to one or more guide members, to hold the remote trigger 302 and slider 320 within a plane defined by axes 30, 32. In the embodiment shown in FIGS. 5 and 11, the main panel of the back plate 340 serves as a first guide member or boundary to prevent movement of one or both of the remote trigger 302 and slider 320 in a first direction along axis 34, while one or more ribs 390, 391 serve as a second guide member or boundary to prevent movement of one or both of the remote trigger 302 and slider 320 in a second (opposite) direction along axis 34. Stated in another way, a portion of the back plate 340 is configured to engage with the rear face of one or both of the remote trigger 302 and slider 320, while a portion of the cover 380 is configured to engage with the front face of one or both of the remote trigger 302 and slider 320, thereby confining the remote trigger 302 and slider 320 to move within the plane defined by axes 30, 32. The aperture 377 in the back plate 340 may also include front and rear walls that serve as boundaries for corresponding faces of the remote trigger 302 and/or slider 320 to keep them in plane.

Figure 12:
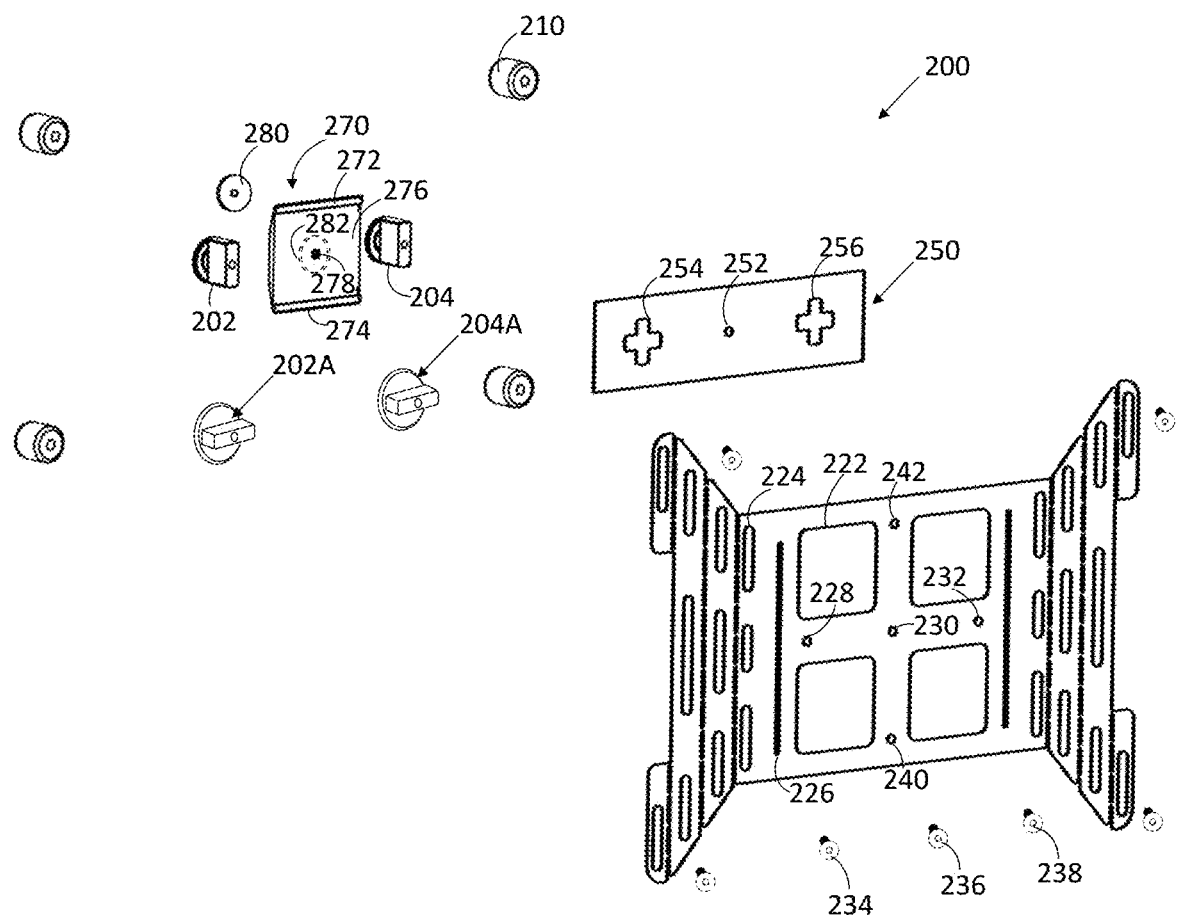
FIG. 12 is an exploded perspective view of the case mount assembly of the first embodiment.

Turning now to FIG. 12, the case mount assembly 200 in one embodiment may comprise one or more of the mount fitting 202, the mount fitting 204, a plurality of feet 218, an internal panel 220, an external panel 250, a bumper 270, and a magnet 290. In one embodiment, these components are configured to sandwich a wall of the case 20, with the internal panel 220 being disposed at an internal face of the case 20 and the external panel 250 and other components being disposed at an external face of the case 20.

The internal panel 220 may include a series of cutouts or voids or apertures (for example, apertures 222, 224, 226) of various shape and size for, among other things: weight reduction; receiving straps, netting, bolts, or other connectors or securement devices to secure cargo; or receiving screws, bolts or other fasteners that extend through the wall of the case 20 for attachment to structures located outside of the case 20, such as the feet 218. With regard to the latter purpose, the internal panel 220 may include a series of apertures 228, 230, 232 for receiving fasteners 234, 236, 238 that extend through the wall of the case 20 to secure the mount fittings 202, 204, external plate 250, and bumper 270 to the external face of the case 20. In alternative embodiments, multiple rows of such apertures 228, 230, 232 may be provided so that the mount fittings 202, 204, external plate 250, and bumper 270 can be secured at different locations on a given wall of the case 20 (and not just across the centerline of case as shown in the figures). For example, a second set of apertures may be provided at the top of the internal plate 220 and/or a third set of apertures may be provided at the bottom of the internal plate 220. In other embodiments, multiple sets of such apertures 228, 230, 232 may be provided in different orientations to accommodate mounting the bag in different orientations. For example, internal plate 220 includes apertures 240, 242, which can be used with fasteners 234, 236, 238 to secure the mount fittings 202, 204, external plate 250, and bumper 270 in a 90° or 270° rotated orientation. The internal panel 240 may comprise one or more break-away panels with break-away edges formed by a series of perforations, so that the size of the internal panel 220 can be modified to accommodate cases of multiple different sizes. See, for example, break-away panel 244, with break-away edge 246.

The external panel 250 may include a central aperture 252 that is configured to receive fastener 236 for attachment to the bumper 270. The external panel may also include one or more registers 254, 256 that are configured to hold the mount fittings 202, 204 in a desired orientation (for example, to prevent them from rotating). In the shown embodiment, the registers 254, 256 are cross-shaped. Stated in other terms, each of the registers 254, 256 may be described as comprising two overlapping apertures that: each have a shape corresponding to the shape of the attachment member, share a centerline, and are rotated 90° to each other. In that respect, the registers 254, 256 can receive the attachment members 208 of the fittings 202, 204 in the orientation shown in FIG. 12, or in a 90° rotation of the fittings 202, 204 about their centerline (see e.g., fittings 202A, 204A).

The bumper 270 serves as a bearing surface for sliding and resting engagement with the outer face of the cover 380 during engagement of the case mount assembly 200 with the surface mount assembly. The bumper 270 may include one or more registers that engage with the external panel 250 to prevent relative rotation between the two. For example, the bumper 270 may include lips 272, 274 at the top and bottom of the bumper 270, respectively, that project rearward of its rear wall 276. In that respect, the external panel 250 is received adjacent the rear wall 276 in a recess formed between the lips 272, 274. The lips 272, 274 thereby engage with the upper and lower edges of the external panel 250 to prevent relative rotation. The bumper 270 may include a hole 278 for receiving and/or engaging with fastener 236. The hole 278 may be a through-hole, as shown, or a blind hole, and may or may not have internal threads for engaging with corresponding threads on the fastener 236. The external face 280 of the bumper 270 may include a recessed area 282 for receiving a nut or other fastener for connecting to fastener 236. Additionally, the bumper 270 may include one or more magnets that are configured to be attracted to one or more magnetic materials on the wall 10, the surface mount assembly 100, and/or the remote release assembly 300 to either or both help the case 20 stay in place when secure and guide the case 20 into place (either or both laterally or up and down) during securement. As shown, the recessed area 282 receives the magnet 290 along a center line of the bumper 270, whereby the magnet 290 is attracted to corresponding magnetic materials that may be provided along a centerline of the remote release assembly 300. The magnet 290 may also include a threaded hole, whereby the magnet 290 serves as a nut or corresponding fastener for the fastener 236.

Notably, the construction of the case mount assembly facilitates transferring the load of cargo in the case 20 from the straps (or other cargo securement, such as nets, etc) to the internal panel 220, through the fasteners, and then to the external plate 250 and mount fittings 202, 204, and ultimately to the mount anchors 102, 104, whereby the load of the cargo substantially bypasses the case 20 (or is not reliant on the case 1020 to stay secure) in an accident, which may not be designed to be crashworthy.

One or more of the surface 10, case 20, surface mount assembly 100, case mount assembly 200, and remote release assembly 300 may include features, including but not limited to one or more guide members, for guiding the mount fittings 202, 204 into alignment with the mount anchors 102, 104 when a user is attempting to mount a case 20 to the surface 10. In that respect, one or a combination of guide members may permit a "blind installation" of the case 20 onto the surface 10 where the user places the case 20 against the surface 10 and the case mount assembly 200 will naturally find engagement with the surface mount assembly 100 as it is lowered. The guide members will help center each of the mount fittings 202, 204 with each the respective mount anchors 102, 104 and put each of the channel engaging members 206 within the same plane as each of the respective channels 122.

For example, in the embodiment shown in FIGS. 1 and 11, the mount fittings 202, 204 (e.g., the channel engaging members 206) may be provided with curved or angled corners 215, 216, which would serve as guide members as they will engage with left and right sides 392, 393 and/or corners 394, 395 of the housing 380 to urge the case 20 left or right (along axis 32), as the situation may require, to the place the center of each fitting 202, 204 (e.g., the attachment 208) in the same plane defined by axes 30, 34 as the center of each mount anchor 102, 104 (e.g., the open slot 124). As an alternative to or in combination to the curved/angled mount fittings 202, 204, at least a portion of the side walls 392, 393 and/or corners 394, 395 of the housing 380 may be angled or curved inward (toward each other) as they extend from the mount anchors 102, 104 to the top of the housing 380. Other guide members positioned elsewhere on any of the surface 10, case 20, surface mount assembly 100, case mount assembly 200, and remote release assembly 300 may serve the same purpose of centering the fittings 202, 204 with the anchors 102, 104.

Figure 13:
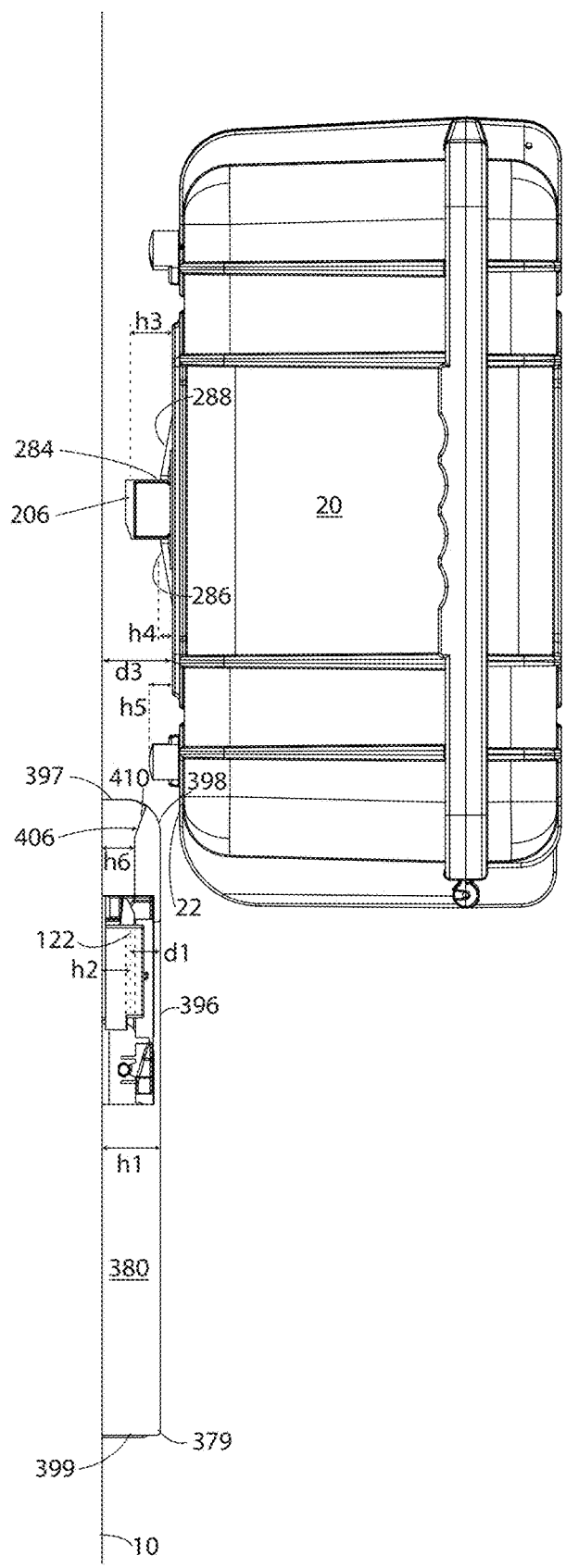
FIG. 13 is a side view showing the case mount assembly of the first embodiment positioned above the remote release assembly of the first embodiment and aligned for securement with the mount anchors.

As another example, in the embodiment shown in FIG. 13, the outer face, edges, or sides of the bumper 270 may be provided with curved or angled features, which would serve to guide the channel engaging members 206 into the same plane as the channels 122 (i.e., the same plane along axes 30, 32). As can be appreciated in FIG. 13, the channel engaging members 206 will be in approximately the same plane as channels 122 when the outer face 284 of the bumper 270 rests against the outer face 396 of the cover 380. This is because the height $h_1$ of the outer face 396 from the surface 10 minus the height $h_2$ of the channel 122 from the surface 10 (i.e., the distance $d_1$ between the outer face 396 and the channel 122) is approximately equal to the height $h_3$ of the channel engaging member 206 from the rear face 22 of the case 20 minus the height $h_4$ of the outer face 284 of the bumper 27 from the rear face 22 of the case 20 (i.e., the distance $d_2$ between the outer face 284 and the channel engaging member 206). That is $d_1$ is approximately equal to $d_2$. When the channel engaging member 206 is in the same plane as the channel 122 (i.e., when the outer face 284 of the bumper 270 at least approximately abuts outer face 396 of the cover 380), the rear face 22 of the case will be a distance $d_3$ from the surface 10. To help smoothly guide the case 20 away from the surface 10 when the rear face 22 of the case 20 is a distance less than distance $d_3$ from the surface 10 as the channel engaging member 206 approaches the channel 122, the bumper 270 may include, as an example, one or both of contoured edge 286 (e.g., curved, chamfered, or angled) and contoured edge 288. If a user attempts to secure a case 20 from the top with the rear face 22 of the case 20 a distance from the surface 10 that is less than distance $d_3$, contoured edge 286 would serve as a guide member as it will engage with the top 397 and/or top corner 398 of the housing 380 to urge the case 20 away from the surface 10, until the outer face 284 of the bumper 270 approximately abuts the outer face 396 of the cover, and thus, the channel engaging members are in the same plane as the channels 122. Similarly, if a user attempts to secure a case 20 from the bottom with the rear face 22 of the case 20 a distance from the surface 10 that is less than distance $d_3$, contoured edge 288 would serve as a guide member as it will engage with the bottom 399 and/or bottom corner 379 of the housing 380 to urge the case 20 away from the surface 10, until the outer face 284 of the bumper 270 approximately abuts the outer face 396 of the cover, and thus, the channel engaging members 206 are in the same plane as the channels 122. As an alternative to or in combination to the contoured edges 286, 288, at least a portion of one or more of the top 397, top edge 398, bottom 399, and bottom edge 379 of the cover 380 may be angled or curved inward (toward the surface 10) as they extend from outer face 396 of the cover 380 to the surface 10. Other guide members positioned elsewhere on any of the surface 10, case 20, surface mount assembly 100, case mount assembly 200, and remote release assembly 300 may serve the same purpose of putting the channel engaging member 206 into the same plane as the channel 122.

Notably, while the feet 218 (having a height $h_5$ from the rear face 22 that exceeds the height $h_3$ of the mount fittings 202, 204) obviously protect the components of the case mount assembly 200 when not mounted to the surface 10, the feet 218 in some embodiments may also serve, in effect, as guide members that help simplify putting the channel engaging members 206 into the same plane as the channels 122. More particularly, if the height $h_5$ of the feet 218 is greater than height $h_3$, but less than or equal to height $h_3$ plus distance $d_3$, the contoured edges 286, 288 will automatically be aligned for contact with the top 397, top edge 398, bottom 399, and/or bottom edge 379 (as the case may be) during securement of the case 1020. Obviously, the height $h_5$ must be less than the height $h_1$, otherwise the feet may prevent the channel engaging member 206 from ever being in the same plane as the channel 122 (assuming surface 10 is flat is present underneath feet 218). While the feet 218 are shown as separate components that are attached to the case 20, they may be integral with the case 20 in alternative embodiments.

To help smoothly guide the case 20 toward the surface 10 when the rear face 22 of the case 20 is a distance greater than distance $d_3$ from the surface 10 as the channel engaging member 206 approaches the channel 122, the cover 380 may include various guide member such as wings 402, 404 having inwardly-directed (toward the surface 10) contoured surfaces 406, 408 that engage and pull the channel engaging members 206 toward the surface into plane with the channels 122 when the case 20 is secured from the top. In the shown embodiment, the contoured surfaces 406, 408 may comprise ramp surfaces 410, 412 that are angled toward the surface 10 from top to bottom. The cover 380 may include similar wings 414, 416 at a lower end thereof with similar contoured surfaces that are defined by ramp surfaces that are angled toward the surface from bottom to top to guide the case 20 when engaged from the bottom. Notably, when the channel engaging members 206 rest against the lower end of the contoured surfaces 406, 408, they will be approximately in plane with the channel 122. In that regard, the height $h_6$ of the contoured surfaces 406, 408 from the surface 10 is approximately equal to the height $h_2$ of the channel 122. As an alternative to or in combination to the contoured surfaces 406, 408, at least a portion of the edge or underside of the channel engaging members 206 may be angled or curved. Other guide members positioned elsewhere on any of the surface 10, case 20, surface mount assembly 100, case mount assembly 200, and remote release assembly 300 may serve the same purpose of putting the channel engaging member 206 into the same plane as the channel 122.

Figure 14:
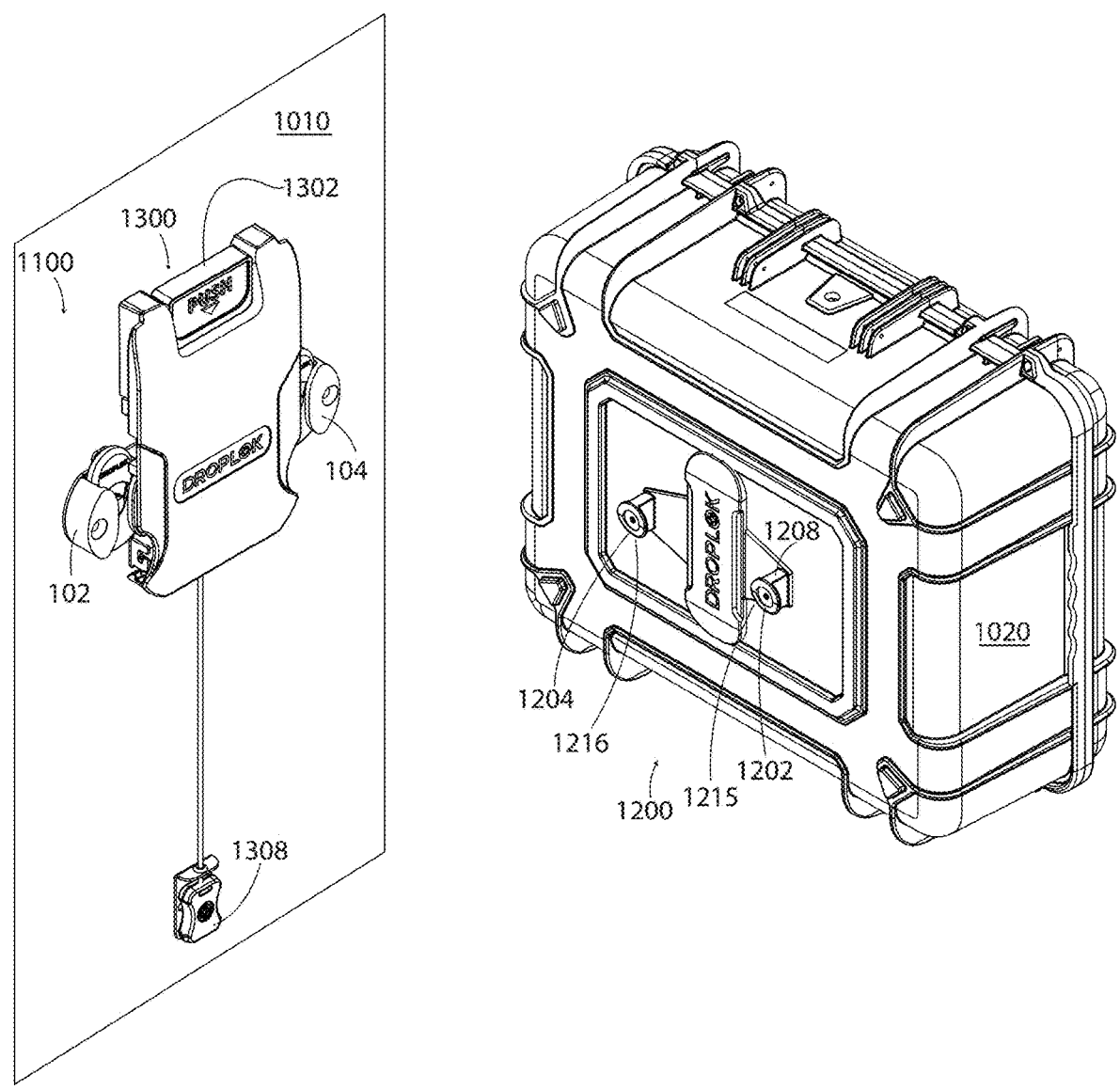
FIG. 14 is a perspective view of a second embodiment of surface mount assembly that includes mount anchors, mount fittings, a remote release assembly, and a case mount assembly that cooperate to releaseably secure a case to a surface.

FIG. 14 shows a second embodiment of a surface mount assembly 1100 and a case mount assembly 1200 that includes many of the same or similar structures and functions in largely the same way as the first embodiment. Various embodiments are contemplated that include any combinations of structures and features of the first and second embodiment.

Like those of the first embodiment, the surface mount assembly 1100 and case mount assembly 1200 of the second embodiment cooperate to secure a case 1020 to a surface 1010, and a remote release assembly 1300 that is configured to unlock the cost mount assembly 1200 from the surface mount assembly 1100. The surface mount assembly 1100 includes one or more mount anchors 102, 104, while the case mount assembly includes one or more corresponding mount fittings 1202, 1204. The mount anchors 102, 104 are configured to engage and lock with the mount fittings 1202, 1204 to hold the case 1020 to the surface 1010.

In the shown embodiment, the mount anchors 102, 104 and mount fittings 1202, 1204 generally take the form of the rapid release anchors and fittings discussed in the Applicant's co-pending U.S. patent application Ser. No. 16/224,703, filed on Dec. 18, 2018 ("the '703 application), and as described more fully above with reference to mount anchors 102, 104 and mount fittings 202, 204 of the first embodiment. However, other forms of corresponding connectors may be used as the mount anchor and mount fitting, including but not limited to magnets. Connectors that are configured for two-way engagement and release (up and down, in the depicted configuration) like the mount anchors 102, 104 and mount fittings 1202, 1204 are preferable.

The surface mount assembly 1100 may further include a remote release assembly 1300 with at least one of remote triggers 1302, 1308 for unlocking one or more of the mount anchors 102, 104. The remote triggers 1302, 1308 may be mechanically and/or electronically (wired or wireless) linked to the mount anchors 102, 104. Preferably, the remote triggers 1302, 1308 are disposed a sufficient distance from the mount anchors 102, 104 in an easily accessible position, although one or both of the remote triggers 1302, 1308 may be obscured from view by the case 20. In the orientation shown in FIG. 14 (vertical surface 1010 and release mechanism 1300 mounted upright), the remote trigger 1302 will be positioned above the case 1020 and the remote trigger 1308 will be positioned below the case 1020 within reach of the user when the case 1020 is mounted to the surface 1010. In other embodiments, one or more remote triggers may be located above the case 1020, at the side of the case 1020, or elsewhere, and there may be multiple remote triggers.

In the shown embodiment, remote trigger 1302 is a push button while the remote trigger 1308 is a pull. Other types of triggers are contemplated. To remove the case 1020 from the surface 1010, the user may grab the case 1020 using a handle on the top-center of the case (not shown) with one hand and simultaneously push the remote trigger 1302 with the same hand. An alternative method of removing the case involves grabbing the case 1020 with one hand and simultaneously pushing the remote trigger 1302 or pulling the remote trigger 1308 downward with the other hand. Triggering one or both of the remote triggers 1302, 1308 causes the mount anchors 102, 104 to unlock. The user may then either lift the case 1020 upward (causing the mount fittings 1202, 1204 to slide upward and out of engagement with the mount anchors 102, 104), or allow the case 1020 to move downward (causing the mount fittings 1202, 1204 to slide downward and out of engagement with the mount anchors 102, 104). If not held by the user, the case 1020 may naturally, due to gravity, drop out of engagement with the mount anchors 102, 104 when one or both of the remote triggers 1302, 1308 are triggered.

Figure 15:
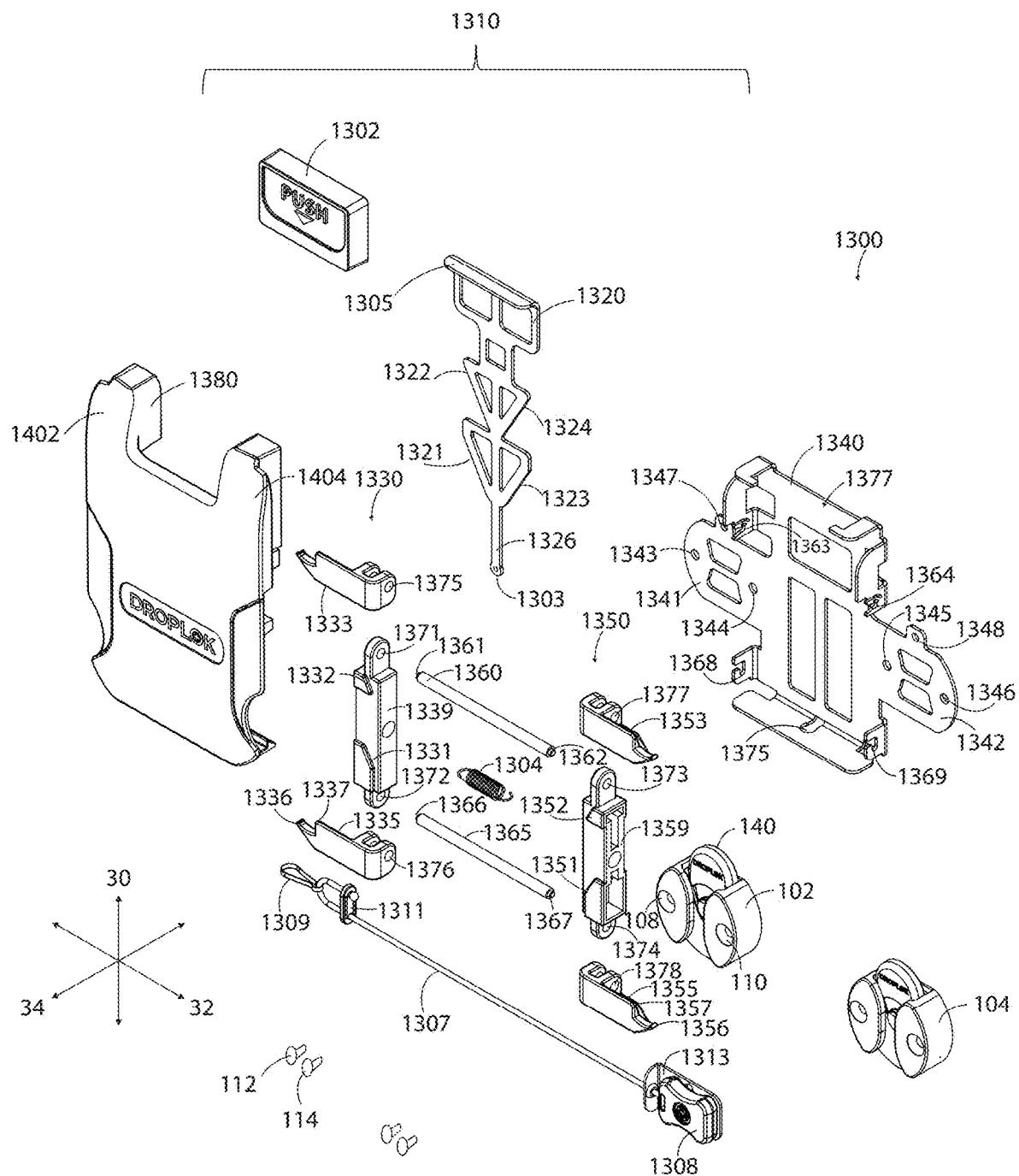
FIG. 15 is an exploded perspective view of the second embodiment of the remote release assembly.

Turning now to FIG. 15, the remote release assembly 1300 is shown in exploded view aside the surface mount assembly 1100. The remote release assembly 1300 may comprise a housing made up of back plate 1340 and cover 1380. The back plate 1340 may include mounting locations 1341, 1342 for the mount anchors 102, 104, respectively. The mounting locations 1341, 1342 may each include bores 343, 1344, 1345, 1346 which line up with corresponding bores 108, 110 in the mount anchors 102, 104 for receiving fasteners 112, 114. In that respect, fasteners 112, 114 may be used to secure the mount anchors 102, 104 to the remote release assembly 1300. In addition, fasteners 112, 114 may be used to not only secure the mount anchors 102, 104 to the surface 1010, but also to secure the remote release assembly 1300 to the surface 1010. The back plate 1340 may also or alternatively include one or more bores 1347, 1348 for receiving separate fasteners (not shown) to separately secure the remote release assembly 1300 to the surface 1010. In alternative embodiments, the mounting locations 1341, 1342 may be omitted, the mount anchors 102, 104 may be secured directly to the surface 1010, and the remote release assembly 1300 may include one or more registers (e.g., on the back plate 1340, the cover 1380, or other component thereof) that correspond to the shape of the mount anchors 102, 104 or a portion thereof, for aligning the remote release assembly 1300 with the mount anchors 102, 104.

The housing of the remote release assembly 1300 is configured to hold the mechanisms and/or electronics that cause the mount anchors 102, 104 to unlock. In the present embodiment, the housing holds a remote release mechanism 1310 that may optionally include a "catch" feature. More specifically, the remote release mechanism 1310 may comprise the remote triggers 1302, 1308, connecting member 1307, a slider 1320, a pair of release members 1330, 1350, guide rods 1360, 1365, and biasing member 1304.

The remote trigger 1302 and the slider 1320 may be configured for linear movement along axis 30 (which, for convenience, will be described as an up/down direction, which corresponds to a typical wall-mount application), while the release members 1330, 1350 are configured for linear movement along axis 32 (which, for convenience, will be described as a lateral or side to side direction, which corresponds to a typical wall-mount application). As will be described below, the remote release assembly 1300 includes one or more features or structures to preclude movement of the remote trigger 1302, slider 1320, and release members 1330, 1350 along other axes.

As shown, the slider 1320 may be configured as a separate component that is rigidly attached to and moves linearly along axis 30 with the remote trigger 1302. Each of the slider 1320 and the remote trigger 1302 may each include a corresponding connector, such as a channel (not shown) or aperture on the rear side of the remote trigger 1302 that receives a lip 1305 or other projection on the slider 1320. The channel may engage with lip 1305 through frictional engagement or through an interference or snap-type fit, or other type of connection. The locations of the channel and lip 1303 may be switched. In an alternative embodiment, the slider 1320 may be made integral with the remote trigger 1302. Remote trigger 1308 may also (optionally) be connected to the slider 1320, for example to the lower portion 1326 or tip 1303, via a connecting member 1307. Connecting member 1307 may be a rigid member, such as a metal or plastic rod or the like, or may be a flexible member, such as a cable or rope or the like. The connecting member 1307 may be length adjustable, and may be removeable from the slider 1320. As shown, connecting member 1307, at a first end, includes a spring clip 1309 for connection to an aperture at tip 1303 and a length adjuster 1311, for adjusting the length, and at a second end, is fixed to the release trigger 1308, which takes the form as a pull. In some embodiments, the connecting member 1307 may pass through an aperture in a frame 1313, which may be fastened to the surface 1010 and act as an upper stop for the release trigger 1308.

The remote trigger 1302 and/or slider 1320 and release members 1330, 1350 include corresponding mechanisms for converting linear movement of the slider along axis 30 into linear movement of the release members 1330, 1350 along axis 32. In one embodiment, as shown in the figures, the slider 1320 includes at least one cam surface 1321, 1322, 1323, 1324 for engagement with at least one corresponding cam surface 1331, 1332, 1351, 1352 on the release members 1330, 1350. The cam surfaces 1321, 1322, 1323, 1324 cooperate with the corresponding cam surfaces 1331, 1332, 1351, 1352 to convert linear movement of remote trigger 1302 and slider 1320 along axis 30, into linear movement of the release members 1330, 1350 along axis 32. Note that corresponding cam surfaces 1331, 1332, 1351, 1352 are present on both the front and rear sides of the release members 1330, 1350, whereby the slider 1320 can be placed either in front of or behind the release members 1330, 1350 and engage with either set of cam surfaces 1331, 1332, 1351, 1352. Cam surfaces 1321, 1323 and cam surfaces 1322, 1324 each form a triangular shape with the apex at the lower end, and corresponding cam surfaces 1331, 1351 and corresponding cam surfaces 1332, 1352 are generally parallel thereto (i.e., corresponding cam surfaces 1331, 1351 and corresponding cam surfaces 1332, 1352 also each form a triangular shape with the apex at the lower end). Pushing remote trigger 1302 and slider 1320 downward, or pulling remote trigger 1308 downward, naturally causes the cam surfaces 1321, 1323 and cam surfaces 1322, 1324 to push corresponding cam surface 1331 away from corresponding cam surface 1351 and corresponding cam surface 1332 away from corresponding cam surface 1352. In other words, downward movement of the remote trigger 1302 and/or remote trigger 1308 causes the release members 1330, 1350 to move away from each other from their locked position, shown in FIG. 16, to their unlocked position, shown in FIG. 17.

Figure 16:
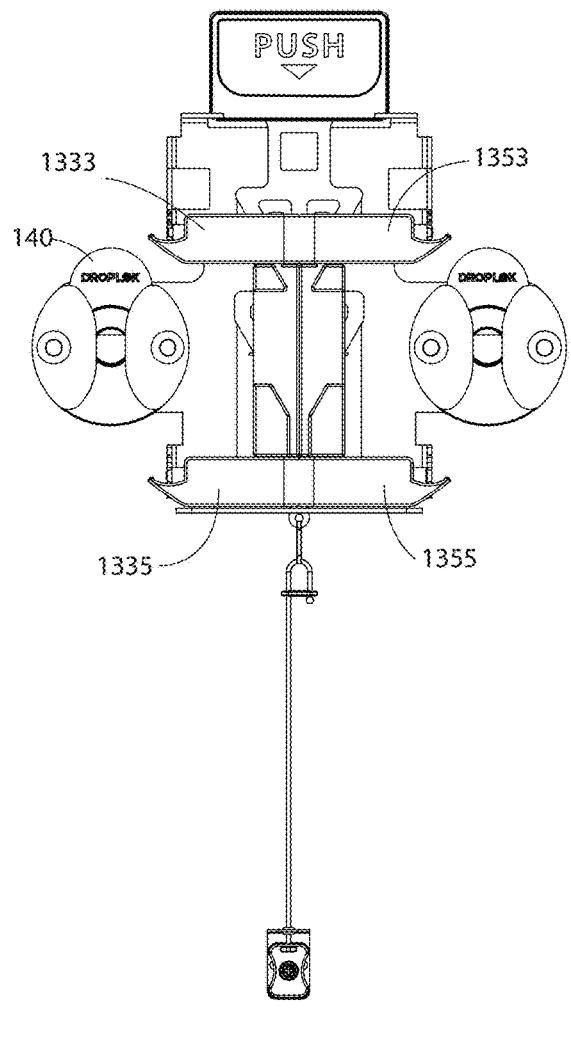
FIG. 16 is a front view of the remote release assembly of the second embodiment in the locked position, with the catches in a non-use position.

The release members 1330, 1350 are interconnected by a biasing member, such as a spring 1304, that pulls the release members 1330, 1350 toward each other, so that they return to their default (locked) position shown in FIG. 16 when downward pressure is removed from the remote trigger 1302 and/or remote trigger 1308. At the same time, the corresponding cam surfaces 1331, 1332, 1351, 1352 will push upward upon the cam surfaces 1321, 1322, 1323, 1324 thereby also moving the remote triggers 1302, 1308 from their unlocked position, shown in FIG. 17, back to their default (locked) position, shown in FIG. 16.

The release members 1330, 1350 may be formed as a single, integrally-formed body, or may be constructed from multiple interconnected components. As shown, the release members 1330, 1350 are each formed from a main body 1339, 1359 that connects via snaps, detents, or other types of connectors to releases 1333, 1353 and catches 1335, 1355. In the shown embodiment, releases 1333, 1353 and catches 1335, 1355 include apertures 1375, 1376, 1377, 1378 that are coaxial with apertures 1371, 1372, 1373, 1374 on the main bodies 1339, 1359, for receiving guide rods 1360, 1365 as described in more detail below. In addition, the main bodies 1339, 1359 include fingers or projections on both the top and bottom that are received in corresponding channels or slots on the releases 1333, 1353 and catches 1335, 1355, whereby the releases 1333, 1353 and catches 1335, 1355 are linked to and move laterally along axis 32 with the main bodies 1333, 1353. The fingers may be received in the channels or slots loosely, or via an interference or friction fit. Note that the front and back sides of the main body 1339, 1359 are mirror images of each other, whereby only a single mold or casting is required to make both main body 1339 and main body 1359 (i.e., they are identical and merely rotated 180° with respect to each other about axis 30). In addition, release 1333 is identical to catch 1335, wherein the snap connection on release 1333 and catch 1335 is compatible with the snap connections on both the top and bottom of the main body 1339. Similarly, release 1353 is identical to catch 1355, wherein the snap connection on release 1353 and catch 1355 is compatible with the snap connections on both the top and bottom of the main body 1359.

Figure 17:
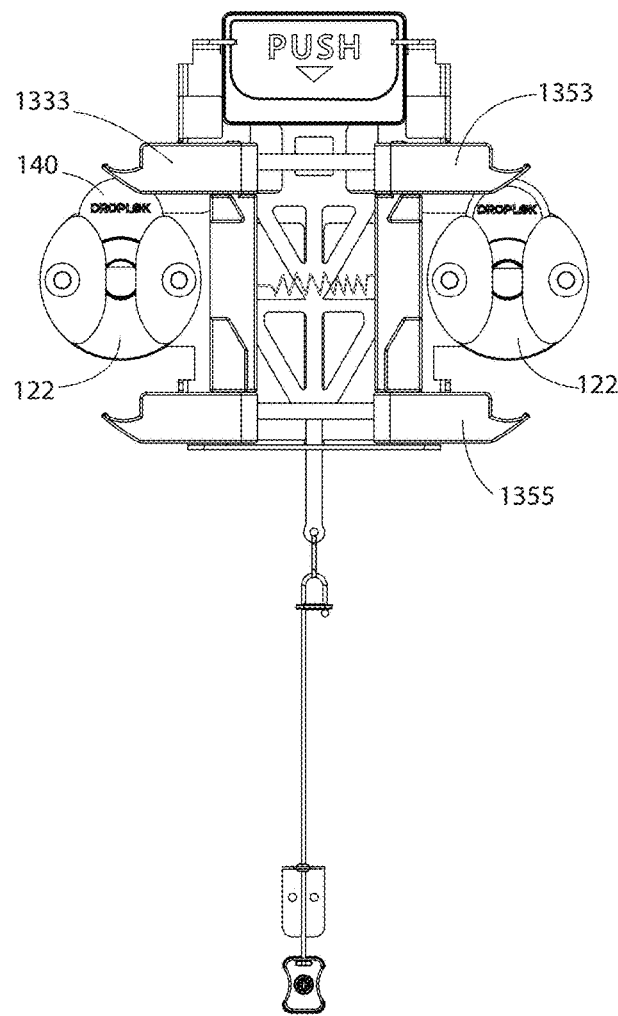
FIG. 17 is a front view of the remote release assembly of the second embodiment in the unlocked position, with the catches in a use position.
Figure 18:
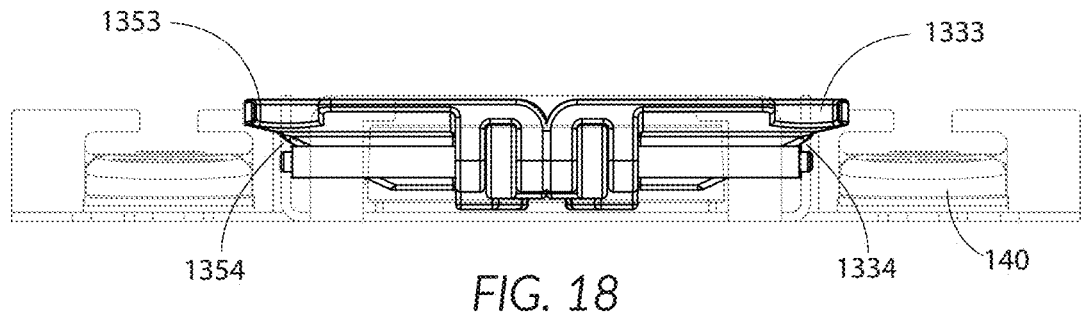
FIG. 18 is a top view of the remote release assembly of the second embodiment.

Releases 1333, 1353 are positioned and configured to engage with, or depress, the triggers 140 of the mount anchors 102, 104, thereby unlocking the mount anchors 102, 104, when the release members 1330, 1350 are in the unlocked position, as shown in FIG. 17. When the release members 1330, 1350 are in the locked position, as shown in FIG. 16, the releases 1333, 1353 are disengaged or spaced from the triggers 140, which allows the triggers 140 to return to their default, locked position. As best shown in FIG. 18, the releases 333, 353 each include an angled or chamfered engagement face 1334, 1354 on its rear side to enable a smooth depression and disengagement of the triggers 140. The angled faces 1334, 1354 and engagement between angled faces 1334, 354 and triggers 140 may also allow the force from spring 135 to assist in moving release members 1330, 1350 back to their locked position after pressure on the remote trigger 1302 and/or remote trigger 1308 is released.

In some embodiments, the surface mount assembly 1100 and/or remote release assembly 1300 may include one or more catches which may be disposed below one or both of the mount anchors 102, 104, in particular below the channel 122. It is contemplated that the catches may be used with or without a remote release assembly 1300, and may be a component separate from both the remote release assembly 1300 and surface mount assembly 1100. The catches may be fixed in place or moveable between a catch position, a stow position, and/or a non-use position (described in further detail below). Moreover, the catches may be attached to any structure of the surface mount assembly 1100, the mount anchors 102, 104, the remote release assembly 1300, or even separately to the surface 1010.

In the embodiment shown in FIGS. 15-17, the catches are part of the remote release assembly 1300, are mechanically linked to the remote triggers 1302, 1308, are biased to a stow position to allow the mount fittings 1202, 1204 to engage the mount anchors 102, 104 from the underside, and only deploy to a catch position underneath the mount anchors 102, 104 when one or both of the remote triggers 1302, 1308 are triggered. More particularly, the release members 1330, 1350 may include catches 1335, 1355 that are disposed underneath the channels 122 of the mount anchors 102, 104 when the release members 1330, 1350 are in the unlocked position (FIG. 17). In that respect, the catches 1335, 1355 may be positioned to catch the case 1020 if it is permitted (accidentally or intentionally) to drop out of the bottom of the mount anchors 102, 104.

The catches permit a one-handed release of the case 1020 from the surface 1010. Using a single hand, the user may trigger one of the remote triggers 1302, 1308, whereby gravity causes the case 1020 to move downward and be captured by the catches. The user may then use the same hand to grip and remove the case 1020.

In one embodiment, as shown in FIGS. 15-17, the catches 1335, 1355 may be formed as a separate and removable component of the release members 1330, 1350. In that respect, the catches 1335, 1355 can be removed from attachment to the body 1339, 1359 of the release members 1330, 1350 to disable the catch feature. One or more connections may be provided in remote locations, for example on any one or more of the components of the remote release assembly 1300 (e.g., on the underside of the housing cover 1380), whereby the catches 1335, 1355 can be connected and stored in the remote location when they are not in use to avoid misplacing the same. In alternative embodiments, the catches may be integrally formed with the release member 1330, 1350, or pivotally attached thereto whereby the catch can pivot between use and non-use positions.

The catches 1335, 1355 may embody a "U" shape or other shaped cradle for receiving, supporting, and holding the attachment member or stem 1208 of the mount fittings 1202, 1204. The catches 1335, 1355 may include upwardly extending members 1336, 1337, 1356, 1357 that are spaced apart a distance that corresponds to and is slightly greater than the width of the stem 1208. When the catches 1335, 1355 are used, upwardly extending members 1336, 1356 engage the outwardly directed side edges of the stem 206 of the mount fittings 1202, 1204, respectively. In that respect, catches 1335, 1355 prevent the biasing force of biasing member 1304 from causing the release members 1330, 1350 to return to their default locked position until the user grips and removes the case 1020.

Figure 19:
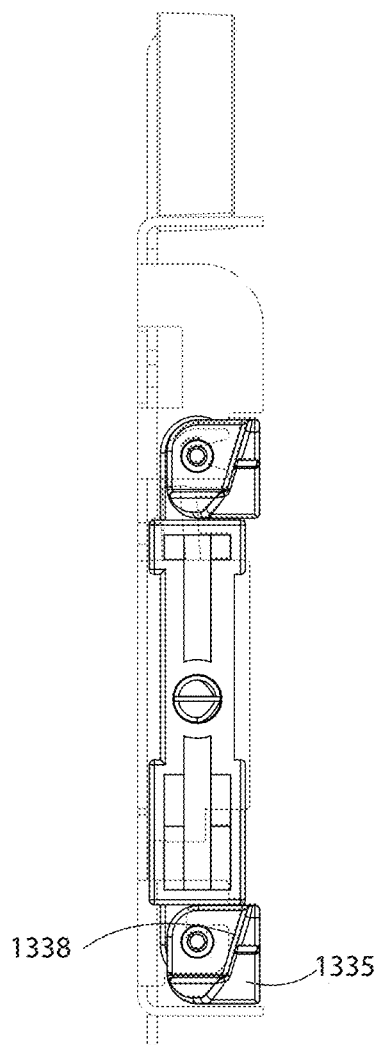
FIG. 19 is a first side view of the remote release assembly of the second embodiment.
Figure 20:
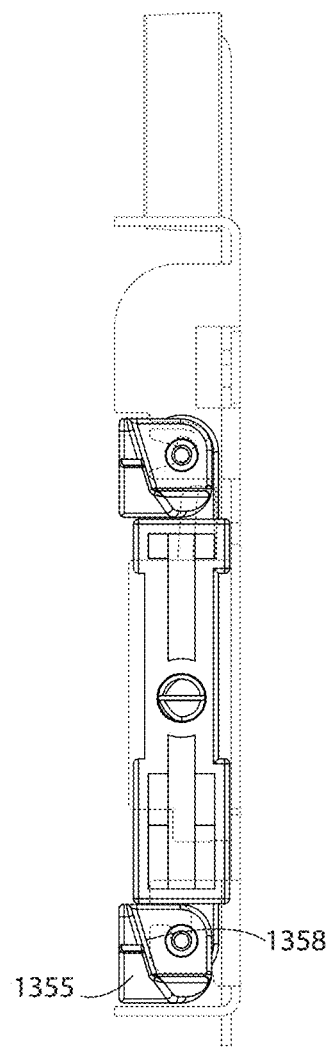
FIG. 20 is a second side view of the remote release assembly of the second embodiment.

The catches 1335, 1355 may be provided with rear bearing structures 1338, 1358 that cause the top of the case 20 to be angled or spaced outward from the surface 10 to enable easier gripping and removal of the case. In one embodiment, as shown the rear bearing structures 1338, 1358 are surfaces that are angled outward from the surface 1010 as they extend from bottom to top, as shown in FIGS. 19-20. When the catches 1335, 1355 are in use holding stems 1208 of the mount fittings 1202, 1204, the channel engaging members 1206 will be oriented at roughly the same angle by virtue of resting adjacent the angled surfaces of the rear bearing structures 1338, 1358.

As previously mentioned, the remote release assembly 1300 may include one or more features, including but not limited to one or more guide members, that keep the release members 1330, 1350 moving only laterally along axis 32. In the embodiment shown in FIGS. 15-17, the guide members are guide rods 1360, 1365 that are received in laterally-facing apertures 1371, 1372, 1373, 1374, 1375, 1376, 1377, 1378. Each of the guide rods 1360, 1365 may include two reduced diameter portions 1361, 1362, 1366, 1367 that are disposed near the opposite ends of the guide rods 1360, 1365. The back plate 1340 may in turn include connection members 1363, 1364, 1368, 1369 that are configured to receive the guide rods 1360, 1365 at the reduced diameter portions 1361, 1362, 1366, 1367 by snap engagement. As shown, connection members 1368, 1369 are recessed slots, while the connection members 1363, 1364 are snap connections, whereby the entire assembly of release members 1330, 1350 may be pivoted into connection with the back plate 1370 about the lower guide rod 1365. In alternative embodiments, the rods 1360, 1365 may instead be mounted to the cover 1380. Moreover, as an alternative to or in combination with the guide rods 1360, 1365, one or both of the back plate 1340 and cover 1380 may include projections or other guide members that form a channel or the like that constrain the release members 1330, 1350 to move laterally along axis 32 and/or keep the release members 1330, 1350 within the plane defined by axes 30, 32, similar to the guide members described below for the remote trigger 1302 and slider 1320.

Also as previously mentioned, the remote release assembly 300 may include one or more features, including but not limited to one or more guide members, that keep the remote trigger 1302 and slider 1320 moving only up and down along axis 30. One such guide member may take form as an aperture or slot 1375 in the back plate 1340 that receives and guides a portion of one or more of the remote trigger 1302 and the slider 1320, in this case a tip 1303 of the slider 1320. As can be appreciated from FIG. 15, the aperture 1375 has a width that generally corresponds to the width of the tip 1303, and has side edges that will engage with the tip 1303 to prevent lateral movement of the remote trigger 1302 and slider 1320 and keep them moving only up and down along axis 30. The back plate 1340 may also include an aperture, channel, or slot 1377 that receives one or both of the remote trigger 1302 and slider 1320 by mating and/or sliding engagement. The aperture 1377 may include side walls that serve as boundaries for corresponding side walls of the remote trigger 1302 and/or slider 1320 to prevent lateral movement thereof. The cover 1380 may also include one or more guide members to guide remote trigger 1302 and slider 1320 moving only along axis 30. In the embodiment shown in FIG. 21, those guide members may include one or a series of projections 1381, 1382, 1383, 1384, 1385, 1386 that form one or more channels 1387, 1388, 1389 that engage with the left and right sides of one or both of the remote trigger 1302 and slider 1320 to prevent lateral movement along axis 32, but permit up and down movement along axis 30. As configured in FIG. 21, the space between projections 1381, 1382 define channel 1387, the space between projections 1383, 1384 define channel 1388, and the space between projections 1385, 1386 define channel 1389. Channel 1387 has a width that roughly corresponds to the width of tip 1303 of the slider 1320, whereby the lower portion 1326 can be received in the channel 1387. Channels 1388, 1399 both have a width that roughly corresponds to the width of the remote trigger 1302, whereby the remote trigger 1302 can be received in the channels 1388, 1389. Of course, any one or more of these projections may be provided on the back plate 1340. Moreover, as an alternative to or in combination with the projections 1381, 1382, 1383, 1384, 1385, 1386, one or both of the back plate 1340 and cover 1380 may include rods or other guide members that serve as rails for the remote trigger 1302 and slider 1320 and constrain those components to move up and down along axis 30 and/or keep the remote trigger 1302 and slider 1320 within the plane defined by axes 30, 32, similar to the guide members described above for the release members 1330, 1350.

The back plate 1340 and cover 1380 also include features, including but not limited to one or more guide members, to hold the remote trigger 1302 and slider 1320 within a plane defined by axes 30, 32. In the embodiment shown in FIGS. 15 and 21, the main panel of the back plate 1340 serves as a first guide member or boundary to prevent movement of one or both of the remote trigger 1302 and slider 1320 in a first direction along axis 34, while one or more raised portions 1390, 1391 serve as a second guide member or boundary to prevent movement of one or both of the remote trigger 1302 and slider 1320 in a second (opposite) direction along axis 34. Stated in another way, a portion of the back plate 1340 is configured to engage with the rear face of one or both of the remote trigger 1302 and slider 1320, while a portion of the cover 1380 is configured to engage with the front face of one or both of the remote trigger 1302 and slider 1320, thereby confining the remote trigger 1302 and slider 1320 to move within the plane defined by axes 30, 32. The slot 1377 and aperture 1375 in the back plate 340 may also include front and rear walls that serve as boundaries for corresponding faces of the remote trigger 1302 and/or slider 1320 to keep them in plane.

Figure 22:
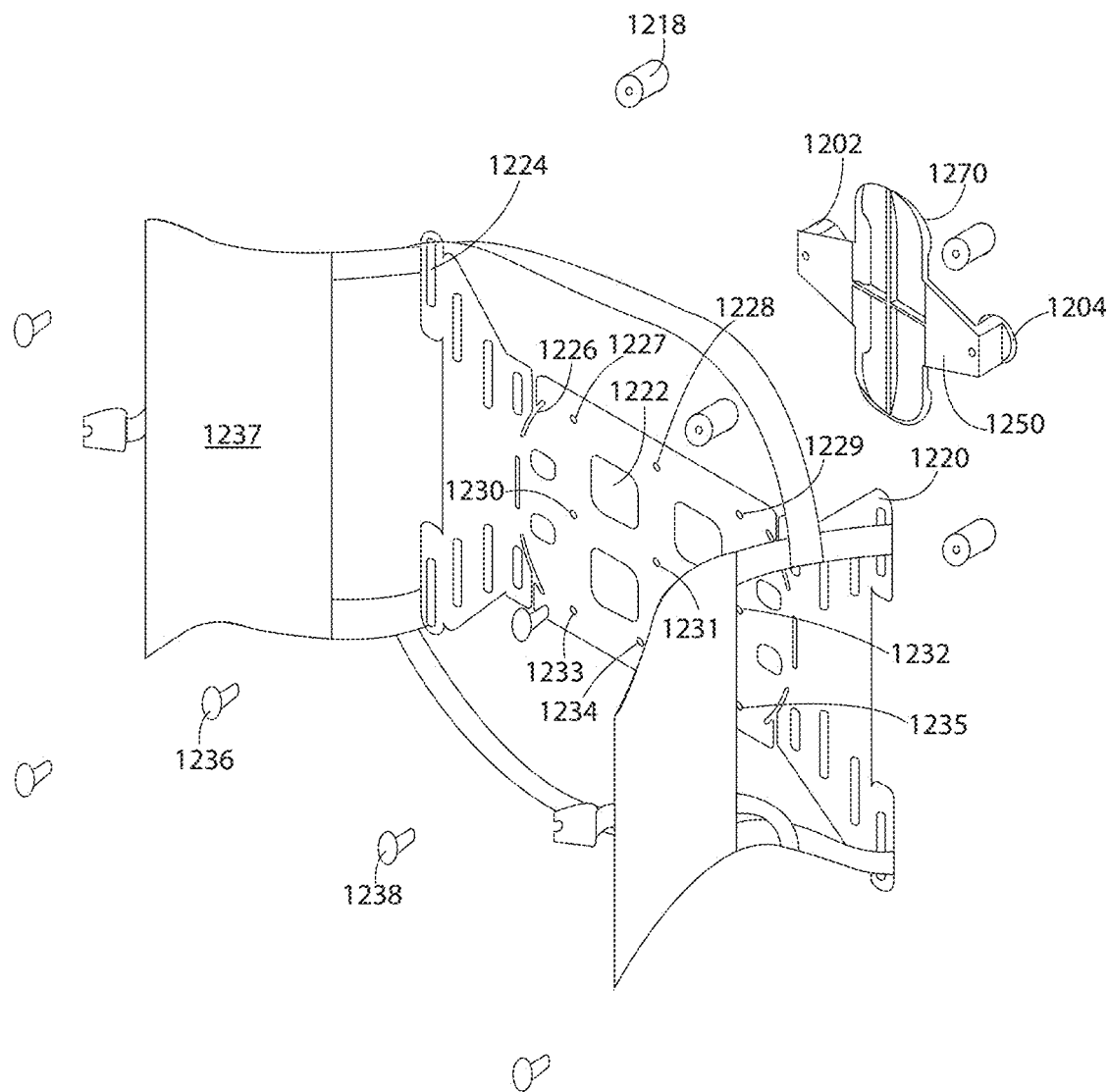
FIG. 22 is an exploded perspective view of the case mount assembly of the second embodiment.

Turning now to FIG. 22, the case mount assembly 1200 in one embodiment may comprise one or more of the mount fitting 1202, the mount fitting 1204, a plurality of feet 1218, an internal panel 220, an external panel 1250, and a bumper 1270. A magnet, like the magnet 290 of the first embodiment, is optional. Moreover, the mount fittings 1202, 1204, external panel 1250, and bumper 1270 may be formed as a single, integrally formed or cast part, as shown, or may be formed as separate, connectable parts as shown for the first embodiment. In one embodiment, these components are configured to sandwich a wall of the case 1020, with the internal panel 1220 being disposed at an internal face of the case 1020 and the external panel 1250 and other components being disposed at an external face of the case 1020.

The internal panel 1220 may include a series of cutouts or voids or apertures (for example, apertures 1222, 1224, 1226) of various shape and size for, among other things: weight reduction; receiving straps, netting, bolts, or other connectors or securement devices to secure cargo (e.g., straps assembly 1237); or receiving screws, bolts or other fasteners that extend through the wall of the case 1020 for attachment to structures located outside of the case 1020, such as the feet 1218. With regard to the latter purpose, the internal panel 1220 may include a series of apertures 1227, 1228, 1229, 1230, 1231, 1232, 1233, 1234, 1235 forming multiple rows and columns for receiving fasteners 1236, 1238 that extend through the wall of the case 1020 to secure the mount fittings 1202, 1204, external plate 1250, and bumper 1270 to the external face of the case 1020. The multiple rows and columns of accommodate different mounting locations for the mount fittings 1202, 1204, external plate 1250, and bumper 1270 whereby the case mount assembly 1200 accommodates mounting the case in different orientations and locations. In alternative embodiments, the internal panel 1220 may comprise one or more break-away panels, for example, with break-away edges formed by a series of perforations, so that the size of the internal panel 1220 can be modified to accommodate cases of multiple different sizes. See, for example, break-away panel 244, with break-away edge 246 of the first embodiment in FIG. 12.

The bumper 1270 serves as a bearing surface for sliding and resting engagement with the outer face of the cover 1380 during engagement of the case mount assembly 1200 with the surface mount assembly 1100, as described in more detail below.

Notably, the construction of the case mount assembly facilitates transferring the load of cargo in the case 20 from the straps assembly 1237 (or other cargo securement, such as nets, etc) to the internal panel 1220, through the fasteners, and then to the external plate 1250 and mount fittings 1202, 1204, and ultimately to the mount anchors 102, 104, whereby the load of the cargo substantially bypasses the case 1020 (or is not reliant on the case 1020 to stay secure) in an accident, which may not be designed to be crashworthy.

One or more of the surface 1010, case 1020, surface mount assembly 1100, case mount assembly 1200, and remote release assembly 1300 may include features, including but not limited to one or more guide members, for guiding the mount fittings 1202, 1204 into alignment with the mount anchors 102, 104 when a user is attempting to mount a case 1020 to the surface 1010. In that respect, one or a combination of guide members may permit a "blind installation" of the case 1020 onto the surface 1010 where the user places the case 1020 against or adjacent the surface 1010 and the case mount assembly 1200 will naturally find engagement with the surface mount assembly 1100 as it is lowered. The guide members will help center each of the mount fittings 1202, 1204 with each the respective mount anchors 102, 104 and put each of the channel engaging members 1206 within the same plane as each of the respective channels 122.

Figure 21:
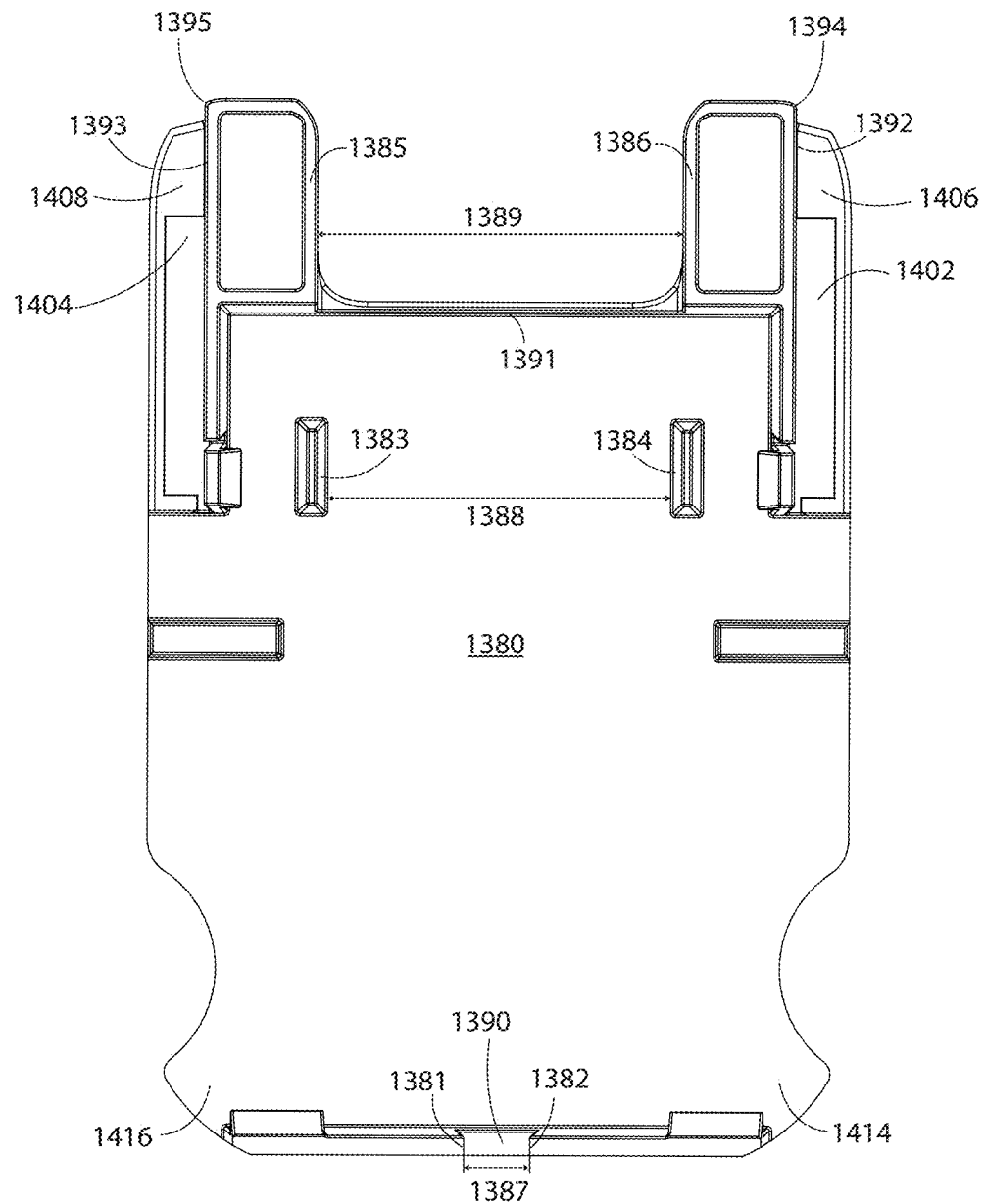
FIG. 21 is a rear view of the cover for the remote release assembly of the second embodiment.

For example, in the embodiment shown in FIGS. 14 and 21, the mount fittings 1202, 1204 (e.g., the channel engaging members 1206) may be provided with curved or angled corners 1215, 1216, which would serve as guide members as they will engage with left and right sides 1392, 1393 and/or corners 1394, 1395 of the housing 1380 to urge the case 1020 left or right (along axis 32), as the situation may require, to the place the center of each fitting 1202, 1204 (e.g., the stem 1208) in the same plane defined by axes 30, 34 as the center of each mount anchor 102, 104 (e.g., the open slot 124). As an alternative to or in combination to the curved/angled mount fittings 1202, 1204, at least a portion of the side walls 1392, 1393 and/or corners 1394, 1395 of the housing 1380 may be angled or curved inward (toward each other) as they extend from the mount anchors 102, 104 to the top of the housing 1380. Other guide members positioned elsewhere on any of the surface 1010, case 1020, surface mount assembly 1100, case mount assembly 1200, and remote release assembly 1300 may serve the same purpose of centering the fittings 1202, 204 with the anchors 102, 104. Similar guide walls and corners may be provided at the bottom of the housing 1380 to help make left/right adjustments for when the user attempts to secure the case from the bottom of the mount anchors 102, 104.

Figure 23:
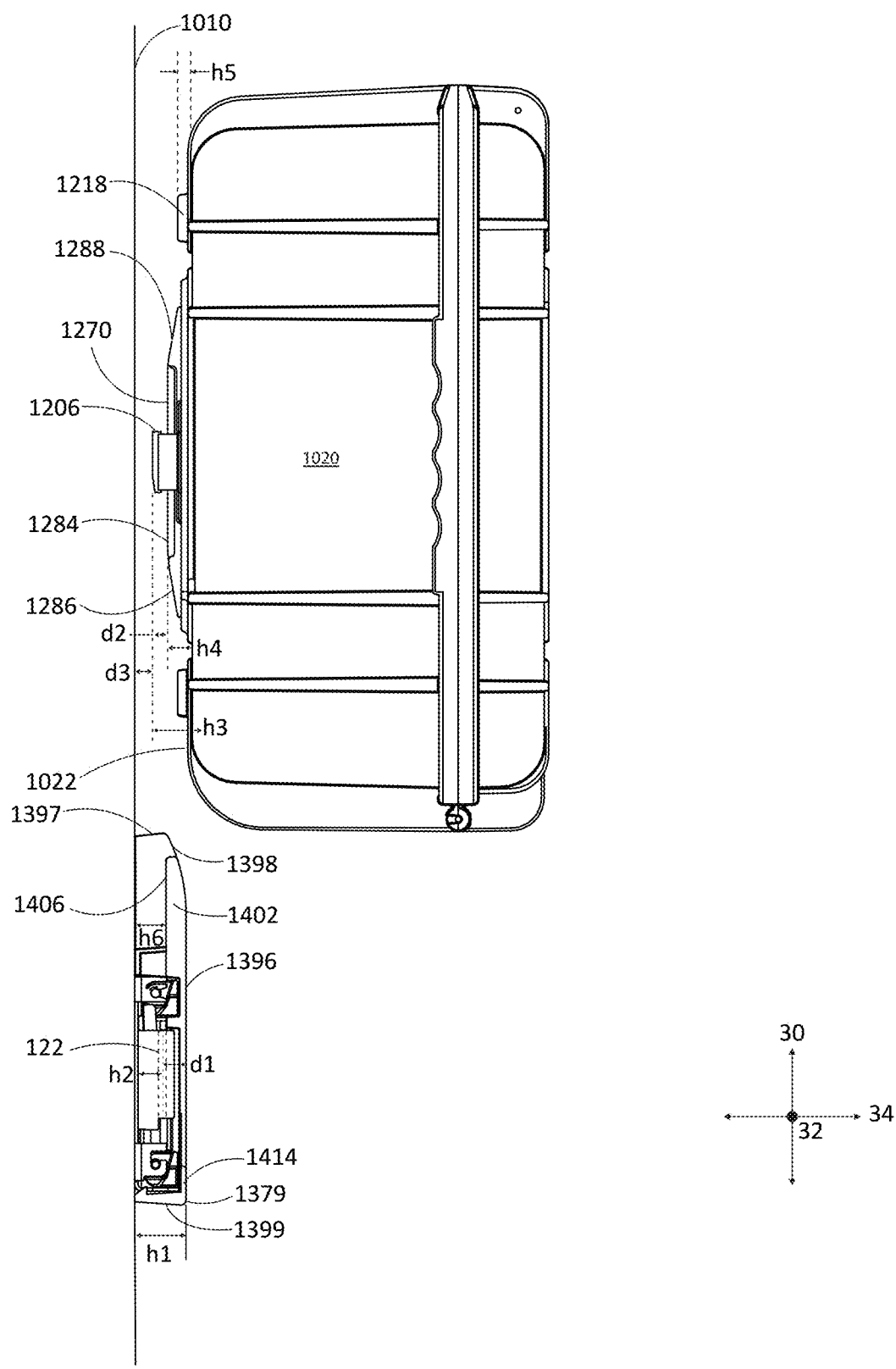
FIG. 23 is a side view showing the case mount assembly of the second embodiment positioned above the remote release assembly of the second embodiment and aligned for securement with the mount anchors.

As another example, in the embodiment shown in FIG. 23, the outer face, edges, or sides of the bumper 1270 may be provided with curved or angled features, which would serve to guide the channel engaging members 1206 into the same plane as the channels 122 (i.e., the same plane along axes 30, 32). As can be appreciated in FIG. 23, the channel engaging members 206 will be in approximately the same plane as channels 122 when the outer face 1284 of the bumper 1270 rests against the outer face 1396 of the cover 1380. This is because the height $h_1$ of the outer face 1396 from the surface 10 minus the height $h_2$ of the channel 122 from the surface 10 (i.e., the distance $d_1$ between the outer face 1396 and the channel 122) is approximately equal to the height $h_3$ of the channel engaging member 1206 from the rear face 1022 of the case 1020 minus the height $h_4$ of the outer face 1284 of the bumper 1270 from the rear face 1022 of the case 1020 (i.e., the distance $d_2$ between the outer face 1284 and the channel engaging member 1206). That is $d_1$ is approximately equal to $d_2$. When the channel engaging member 1206 is in the same plane as the channel 122 (i.e., when the outer face 284 of the bumper 1270 at least approximately abuts outer face 1396 of the cover 1380), the rear face 1022 of the case will be a distance $d_3$ from the surface 1010. To help smoothly guide the case 1020 away from the surface 1010 when the rear face 1022 of the case 1020 is a distance less than distance $d_3$ from the surface 1010 as the channel engaging member 206 approaches the channel 122, the bumper 1270 may include, as an example, one or both of contoured edge 1286 (e.g., curved, chamfered, or angled) and contoured edge 1288. If a user attempts to secure a case 1020 from the top with the rear face 1022 of the case 1020 a distance from the surface 1010 that is less than distance $d_3$, contoured edge 1286 would serve as a guide member as it will engage with the top 1397 and/or top corner 1398 of the cover 380 to urge the case 1020 away from the surface 1010, until the outer face 1284 of the bumper 1270 approximately abuts the outer face 1396 of the cover, and thus, the channel engaging members 1206 are in the same plane as the channels 122. Similarly, if a user attempts to secure a case 1020 from the bottom with the rear face 1022 of the case 1020 a distance from the surface 1010 that is less than distance $d_3$, contoured edge 1288 would serve as a guide member as it will engage with the bottom 1399 and/or bottom corner 1379 of the cover 1380 to urge the case 1020 away from the surface 1010, until the outer face 1284 of the bumper 1270 approximately abuts the outer face 1396 of the cover, and thus, the channel engaging members 1206 are in the same plane as the channels 122. As an alternative to or in combination to the contoured edges 1286, 1288, at least a portion of one or more of the top 1397, top edge 1398, bottom 1399, and bottom edge 1379 of the cover 1380 may be angled or curved inward (toward the surface 1010) as they extend from outer face 1396 of the cover 1380 to the surface 1010. Other guide members positioned elsewhere on any of the surface 1010, case 1020, surface mount assembly 1100, case mount assembly 1200, and remote release assembly 1300 may serve the same purpose of putting the channel engaging member 1206 into the same plane as the channel 122.

Notably, the feet 1218 may have a height $h_5$ from the rear face 1022 that exceeds the height $h_3$ of the mount fittings 1202, 1204 to protect the components of the case mount assembly 2100 when not mounted to the surface 1010. In addition, the feet 1218 in some embodiments may also serve, in effect, as guide members that help simplify putting the channel engaging members 1206 into the same plane as the channels 122. More particularly, if the height $h_5$ of the feet 1218 is greater than height $h_3$, but less than or equal to height $h_3$ plus distance $d_3$, the contoured edges 1286, 1288 will automatically be aligned for contact with the top 1397, top edge 1398, bottom 1399, and/or bottom edge 1379 (as the case may be) during securement of the case 1020.

Obviously, the height $h_5$ must be less than the height $h_1$, otherwise the feet may prevent the channel engaging member 1206 from ever being in the same plane as the channel 122 (assuming surface 1010 is flat is present underneath feet 1218). While the feet 1218 are shown as separate components that are attached to the case 1020, they may be integral with the case 1020 in alternative embodiments.

To help smoothly guide the case 1020 toward the surface 1010 and prevent the rear face 1022 of the case 1020 from moving more than a distance of $d_3$ from the surface 1010 as the channel engaging member 1206 approaches the channel 122, the cover 380 may include various guide member such as wings 402, 404 having inwardly-directed (toward the surface 1010) contoured surfaces 1406, 1408 that engage the channel engaging members 1206 ensuring they stay in plane with the channels 122 when the case 1020 is secured from the top. In alternative embodiments, the contoured surfaces 1406, 1408 may comprise ramp surfaces (like the first embodiment) that are angled toward the surface 1010 from top to bottom. The cover 1380 may include similar wings 1414, 1416 at a lower end thereof with similar contoured surfaces that may be defined by ramp surfaces that are angled toward the surface from bottom to top to guide the case 1020 when engaged from the bottom. Notably, when the channel engaging members 1206 rest against the at least the lower end of the contoured surfaces 1406, 1408, they will be approximately in plane with the channel 122. In that regard, the height $h_6$ of the contoured surfaces 406, 408 from the surface 10 is approximately equal to the height $h_2$ of the channel 122 (differences accounting for the thickness of the channel 122 and channel engaging member 1206). As an alternative to or in combination to the contoured surfaces 1406, 1408, at least a portion of the edge or underside of the channel engaging members 1206 may be angled or curved. Other guide members positioned elsewhere on any of the surface 1010, case 1020, surface mount assembly 1100, case mount assembly 1200, and remote release assembly 1300 may serve the same purpose of putting the channel engaging member 1206 into the same plane as the channel 122.

Figure 24:
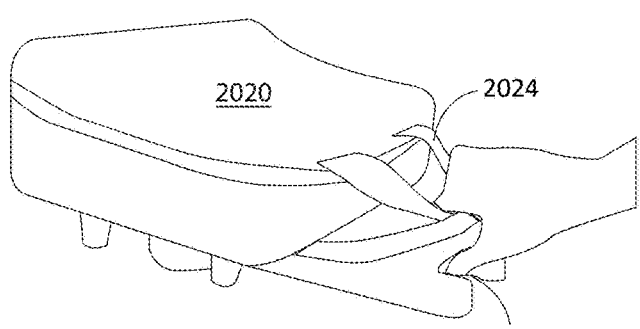
FIG. 24 is a perspective view of a third embodiment of a surface mount assembly secured to a shelf and with the case handle positioned closely adjacent to a release trigger to permit single-handed release.

Turning now to FIG. 24, as previously discussed, the release trigger 2302 and case handle 2024 (rigid or flexible) of any embodiment disclosed herein may be disposed in close proximity when the case 2020 is secured. More particularly, the release trigger 2302 and case 2024 may be disposed within simultaneous reach of a user's single hand, whereby the user can grasp the handle 2024 and simultaneously depress the trigger 2302 with the same, single hand. For example, the user could grasp the handle 2024 with their fingers and palm and depress the release trigger 2302 with their thumb (or grasp the handle 2024 with their thumb and palm and depress the release trigger 2302 with their fingers).

Figure 25:
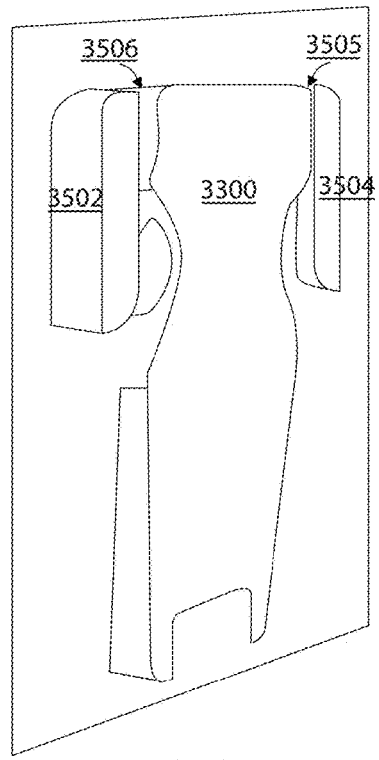
FIG. 25 is a perspective view of a fourth embodiment of a surface mount assembly with additional "elephant ear" guides.

Turning now to FIG. 25, additional guide members 3502, 3504 for the outside edges of the mount fittings may be provided on opposite sides of any embodiment of the remote release assembly 3300 to create channels 3506, 3508 for receiving the mount fittings.

Figure 26:
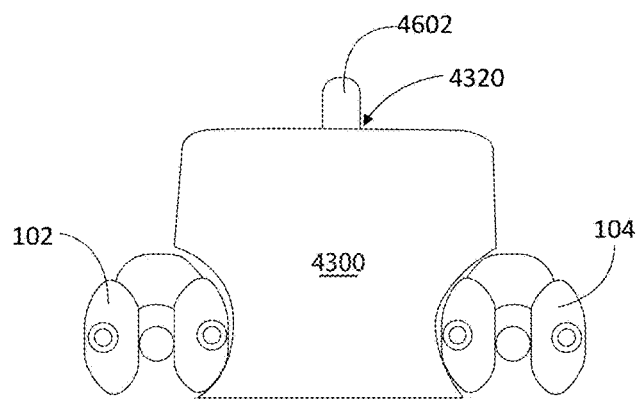
FIG. 26 is a front view of a fifth embodiment of a surface mount assembly that includes a visual safety indicator of an unsafe condition (unlocked condition)

Turning now to FIG. 26, any embodiment herein may be provided with a visible or audible safety indicator that indicates whether any of the release triggers are in an unlocked condition. The safety indicator may be electronic, such as a light bulb or speaker, and may be triggered by a sensor that detects the unlocked condition of the trigger (e.g., the trigger on the mount anchors or remote release assembly). The safety indicator may also be mechanical, such as an extension 4602 of the slider 4320 that becomes visible outside of the housing of the remote release assembly 4300 when the remote release assembly 4300 is in the unlocked condition. In alternative embodiments, the safety indicator may be an extension of any other component of the remote release assembly 4300 or mount anchors 102, 104, and may be visible at a remote location or visible through a window in the housing of the remote release assembly 4300.

Figure 27:
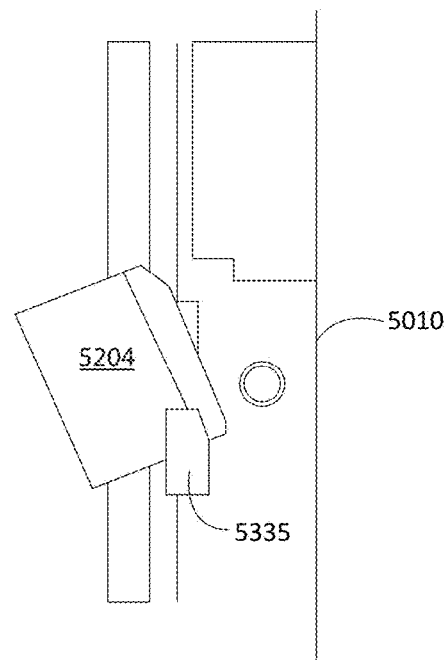
FIG. 27 is a side view of a sixth embodiment of a surface mount assembly with angled bearing surfaces on the catch that places the case in an easily accessible orientation (tilted outwards with top mounted handle spaced away from the surface)

Turning now to FIG. 27, one version of a catch 5355 is shown in combination with a mount fitting 5204 to show how it holds the mount fitting 5204 at an angled orientation relative to the surface 5010.

Figure 28:
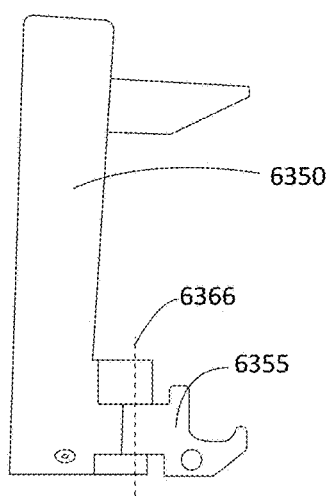
FIG. 28 is a front view of a sixth embodiment of a release member with a catch that pivots between a use and non-use position.

Turning now to FIG. 28, an alternative embodiment of a release member 6350 is shown with a pivotally connected catch 6355 in the use position that can be rotated about pivot axis 6366 into a non-use, or stowed position.

While the previously described remote release assemblies are mechanical in nature, alternative embodiments that are electronically controlled are contemplated. In one such embodiment, an electronically controlled expansion member (not shown) can be positioned between the release members to move the release members from the locked position to the unlocked position, and then back to the locked position. The expansion member can take the form of a linear actuator, pneumatic or hydraulic cylinder and piston, solenoid, or other similar device that is operated using a switch, button, or other electronic control on or remote from the housing of the remote release assembly. The expansion member can be a substitute for the remote release mechanism or can be provided in combination with the remote release mechanism. In that respect, the remote release mechanism could serve as a manually-operated backup in the event of a power interruption or other failure of the expansion member.

Note that any of the previous embodiments may be mounted to a vertical surface (as shown in FIG. 1), such as an internal or external wall of an ambulance and/or the side of an ambulance cot, although the surface mount assembly 100 may be mounted to a surface of any orientation, including a horizontal surface, such as a shelf (as shown in FIG. 24). For convenience, regardless of mounting orientation, axis 30 may be referred to herein as a y-axis, axis 32 may be referred to herein as an x-axis, and axis 34 may be referred to as a z-axis.

FIGS. 29-31 depict a seventh embodiment of a case mount assembly 7200 that is configured to cooperate with a surface mount assembly (not shown) to secure a case 20 to a surface. The case mount assembly 7200 may be used with any of the previously mentioned surface mount assemblies, with the option of a remote release assembly, or in its simplest form with two mount anchors secured to a surface. The case mount assembly 7200 generally comprises an internal plate assembly 7220, an external plate 7250, and one or more guide brackets 7270. The case 20 is sandwiched between the internal plate assembly 7220 on the internal side and the external plate (or fitting bracket) 7250, the guide brackets 7270, 7272, and the mount fittings 202, 204 on the external side, all of which are secured together using a plurality of fasteners. As with the previous embodiments, the mount fittings 202, 204 are configured to be received by corresponding mount anchors 102, 104 mounted to the surface 10. In addition, the guide brackets 7270, 7272 are designed to engage with corresponding surfaces on either the mount anchors 102, 104 or an associated remote release assembly, to guide the mount fittings 202, 204 into proper alignment with the mount anchors 102, 104. Additionally, the guide brackets 7270, 7272 may include or otherwise serve as "feet" to protect the mount fittings 202, 204 when the case 20 is in use and set down on a surface.

The internal plate assembly 7220 is configured to hold one or more cargo items by receiving and engaging with one or more fittings 7202 that are integrated into or fasted to the cargo item. The fittings 7202 may be essentially identical to the mount fittings 202, 204. In one embodiment, the internal plate assembly 7220 may comprise an "integrated" plate 7224, a spring plate 7226, one or more springs 7228, and one or more spacers 7230. The integrated plate 7224 and spring plate 7226 sit in overlying relation and each have overlying apertures that receive fasteners. The fasteners also receive the springs 7228 and spacers 7230, which are located between the plates 7224, 7226 and the inside surface of the case 20. The aperture, however, in the spring plate 7226 is larger (e.g., has a greater diameter) than both the aperture in the integrated plate 7224 and the spacers 7230, while the aperture in the integrated plate 7224 is smaller (e.g., has a smaller diameter) than the spacers 7230. In that respect, the spacers 7230 will keep the integrated plate 7224 at a fixed distance from the inside surface of the case 20, but will not prevent the spring plate 7226 from "floating", i.e., moving back and forth along the length of the fastener. The springs 7228 are coaxial with and larger than the spacers 7230, but smaller than the aperture in the spring plate 7226. In that respect, the springs 7228 urge the spring plate 7226 against the integrated plate 7224.

The integrated plate 7224 includes a plurality of connectors 7232 for receiving fittings 7202, while the spring plate 7226 includes surfaces 7234 that sit directly behind the connectors 7232. Note that while the surfaces 7234 on the spring plate 7226 take the form of a plurality of strips that are separated by large apertures, the large apertures are included solely for the purpose of weight reduction. In that regard, the surfaces 7234 may take any shape or form. In fact, the spring plate 7226 could comprise a flat sheet with no apertures other than those for receiving the fasteners previously discussed. As best shown in FIG. 31, the connectors 7232 may comprise a slot 7236 with a circular portion at one end and a generally rectangular portion at the other end (top and bottom in this configuration). The rectangular portion is includes one or more spring clips 7238 that may take the form as inwardly-biased arms positioned at opposites side of the rectangular portion, wherein the ends of the arms nearest the circular portion include inwardly directed projections 7240. As best shown in FIG. 30, the circular portion of the slot 7236 is configured to receive the channel engaging member 206 of the fitting 7202 which puts the channel engaging member 206 into contact with the surface 7234 of the spring plate 7226. By applying pressure on the fitting 7202 toward the case, the springs 7228 will be depressed and a space will form between the integrated plate 7224 and the spring plate 7226, whereby the integrated plates 7224 and the spring plate will sandwich the channel engaging member 206. At this point, the user can slide the fitting 7202 to the other end of the slot, i.e., into the rectangular portion. As the user slides the fitting 7202 into the rectangular portion, the spring clips 7238 will be displaced outward until the attachment member 208 is fully inserted and the projections 7240 may snap into an interference fit with a top edge of the attachment member 208. At this point, the fitting 7202 will be unable to move in any direction within the plane of the integrated plate 7224 by virtue of the perimeter of the rectangular portion and the spring clips 7238. Because the width of the rectangular portion is less than the width of the channel engaging member, the user will be unable to pull the fitting 7202 out of the connector 7232 in a direction normal to the integrated plate 7224. Of course, the fitting 7202 can be removed, via upward pressure upward on the fitting 7202, the magnitude of which can be varied by modifying the spring coefficient, until the spring clips 7238 disengage.

Notably, in the embodiment of FIGS. 29-31, the cargo will be secured directly to the plates, which is directly secured to the fitting bracket and fittings, whereby the load carried by the plates will be transferred directly the surface (e.g., a vehicle wall) during transit. This takes the case, a weak point, out of the equation, allowing the case mount assembly to be crash-worthy.

Each of the integrated plate 7224 and spring plate 7226 may be constructed from a single sheet of material, for example, metal or plastic or other rigid material. The various features thereof (described above) may be formed by stamping, cutting, milling, or other machining processes, or may be separately created and attached thereto.

Although the inventions described and claimed herein have been described in considerable detail with reference to certain embodiments, one skilled in the art will appreciate that the inventions described and claimed herein can be practiced by other than those embodiments, which have been presented for purposes of illustration and not of limitation. Therefore, the spirit and scope of the appended claims should not be limited to the description of the embodiments contained herein.

We claim:

1. A surface mount assembly for securing an item to a surface, the surface mount assembly comprising:
   a mount fitting adapted for attachment to the item;
   a mount anchor adapted for attachment to the surface and configured for locking engagement with the mount fitting;
   a catch configured to receive the mount fitting when disengaged from locking engagement with the mount anchor thereby preventing the item from dropping due to gravity.

2. The surface mount assembly of claim 1, wherein the catch is disposed below the mount anchor and receives the mount fitting as it drops from engagement with the mount anchor.

3. The surface mount assembly of claim 1, wherein the catch is selectively moveable between a use position and a non-use position, wherein in the use position the catch is positioned to receive the mount fitting when disengaged from locking engagement with the mount anchor and in the non-use position the catch is not positioned to receive the mount fitting when disengaged from locking engagement with the mount anchor.

4. The surface mount assembly of claim 3, wherein the catch is hand-releaseable from the surface mount assembly, whereby the catch is placed in the non-use position by detaching the catch from the surface mount assembly.

5. The surface mount assembly of claim 3, wherein the catch pivots between the use position and the non-use position.

6. The surface mount assembly of claim 3, wherein the catch translates between the use position and the non-use position.

7. The surface mount assembly of claim 6, further comprising a release, wherein the catch translates to the use position when the release is activated.

8. The surface mount assembly of claim 7, wherein the release and catch are mechanically linked.

9. The surface mount assembly of claim 3, wherein the catch in the use position is disposed below the mount anchor and receives the mount fitting as it drops from engagement with the mount anchor, and in the non-use position is not disposed below the mount anchor.

10. The surface mount assembly of claim 1, wherein the catch comprises a cradle for receiving the mount fitting.

11. The surface mount assembly of claim 10, whereby a shape of the cradle generally corresponds to a shape of the mount fitting.

12. The surface mount assembly of claim 10, wherein the catch is defined by a first and second spaced apart upwardly extending members, wherein a distance between the first and second spaced apart upwardly extending members generally corresponds to a portion of the mount fitting.

13. The surface mount assembly of claim 1, wherein the mount fitting has a first orientation when lockingly engaged with the mount anchor and a second orientation when received by the catch, the first orientation being different from the second orientation.

14. The surface mount assembly of claim 13, wherein in the first orientation a top of the item is a first distance away from the surface and in the second orientation the top of the item is a second distance away from the surface, the second distance being greater than the first.

15. The surface mount assembly of claim 13, further comprising a bearing structure disposed at an interface between the catch and the mount fitting, wherein the bearing structure holds the mount fitting in the second orientation.

16. The surface mount assembly of claim 15, wherein the bearing structure is a bearing surface disposed at an angle to the surface.

17. A surface mount assembly for securing an item to a surface, the surface mount assembly comprising:
   a mount fitting adapted for attachment to the item;
   a mount anchor adapted for attachment to the surface and configured for locking engagement with the mount fitting;
   a catch configured to receive the mount fitting when disengaged from locking engagement with the mount anchor thereby preventing the item from dropping due to gravity;
   wherein the catch is selectively moveable between a use position and a non-use position, wherein in the use position the catch is positioned to receive the mount fitting when disengaged from locking engagement with the mount anchor and in the non-use position the catch is not positioned to receive the mount fitting when disengaged from locking engagement with the mount anchor;
   wherein the catch is biased to the non-use position.

18. The surface mount assembly of claim 17, wherein the mount fitting, when received by the catch, holds the catch in the use position and wherein the catch returns to the non-use position when the mount fitting is removed from the catch.

19. A surface mount assembly for securing an item to a surface, the surface mount assembly comprising:
   a mount fitting adapted for attachment to the item;
   a mount anchor adapted for attachment to the surface and configured for locking engagement with the mount fitting;
   a catch configured to receive the mount fitting when disengaged from locking engagement with the mount anchor thereby preventing the item from dropping due to gravity;
   wherein the mount fitting has a first orientation when lockingly engaged with the mount anchor and a second orientation when received by the catch, the first orientation being different from the second orientation;
   wherein the first orientation is generally parallel to the surface and the second orientation is at an angle to the surface.

20. A surface mount assembly for securing an item to a surface, the surface mount assembly comprising:
   a mount fitting adapted for attachment to the item;
   a mount anchor adapted for attachment to the surface and configured for locking engagement with the mount fitting;
   a catch configured to receive the mount fitting when disengaged from locking engagement with the mount anchor thereby preventing the item from dropping due to gravity;
   wherein the mount fitting is generally T-shaped with a channel engaging member disposed at the end of a base, the mount anchor includes a channel for receiving the channel engaging member and a slot for receiving the base, the channel and the slot being configured to receive the channel engaging member and base from both of a top end and a bottom end, the catch includes a cradle for receiving the base as it drops from the bottom end of the slot, and a width of the cradle is less than a width of the channel engaging member.

* * * * *